United States Patent
Bone et al.

(10) Patent No.: US 9,857,557 B1
(45) Date of Patent: Jan. 2, 2018

(54) OPTICAL LENS ASSEMBLY

(71) Applicant: Genius Electronic Optical Co., Ltd., Taichung (TW)

(72) Inventors: Matthew Bone, Taichung (TW); Yanxuan Yin, Fujian (CN); Guangyun Li, Fujian (CN); Feng Chen, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 0 days.

(21) Appl. No.: 15/212,288

(22) Filed: Jul. 18, 2016

(30) Foreign Application Priority Data

Jul. 5, 2016 (CN) .......................... 2016 1 0520795

(51) Int. Cl.
| G02B 9/34 | (2006.01) |
| G02B 13/00 | (2006.01) |
| G02B 9/58 | (2006.01) |
| G02B 27/00 | (2006.01) |

(52) U.S. Cl.
CPC ............... *G02B 9/34* (2013.01); *G02B 9/58* (2013.01); *G02B 13/004* (2013.01); *G02B 27/0025* (2013.01)

(58) Field of Classification Search
CPC ... G02B 9/34; G02B 9/36; G02B 9/38; G02B 9/44; G02B 9/50; G02B 9/56; G02B 9/58

USPC ................... 359/715, 747, 771–783
See application file for complete search history.

(56) References Cited

U.S. PATENT DOCUMENTS

| 4,682,862 A * | 7/1987 | Moskovich | G02B 9/34 359/649 |
| 2008/0106809 A1* | 5/2008 | Hirano | G02B 9/58 359/784 |
| 2009/0122422 A1* | 5/2009 | Yoshida | G02B 9/34 359/717 |
| 2013/0208365 A1* | 8/2013 | Hsu | G02B 13/02 359/715 |
| 2014/0253983 A1* | 9/2014 | Nagano | G02B 9/34 358/475 |

* cited by examiner

*Primary Examiner* — Darryl J Collins
(74) *Attorney, Agent, or Firm* — JCIPRNET

(57) ABSTRACT

An optical lens assembly includes a first lens element, a second lens element, a third lens element, and a fourth lens element from an object side to an image side in order along an optical axis. The first lens element to the fourth lens element each include an object-side surface facing the object side and allowing imaging rays to pass through and an image-side surface facing the image side and allowing the imaging rays to pass through. The object-side surface of the first lens element has a convex portion in a vicinity of the optical axis. The second lens element has positive refracting power, and the object-side surface of the second lens element has a concave portion in a vicinity of a periphery of the second lens element. The third lens element is made of glass having an Abbe number greater than 60.

17 Claims, 31 Drawing Sheets

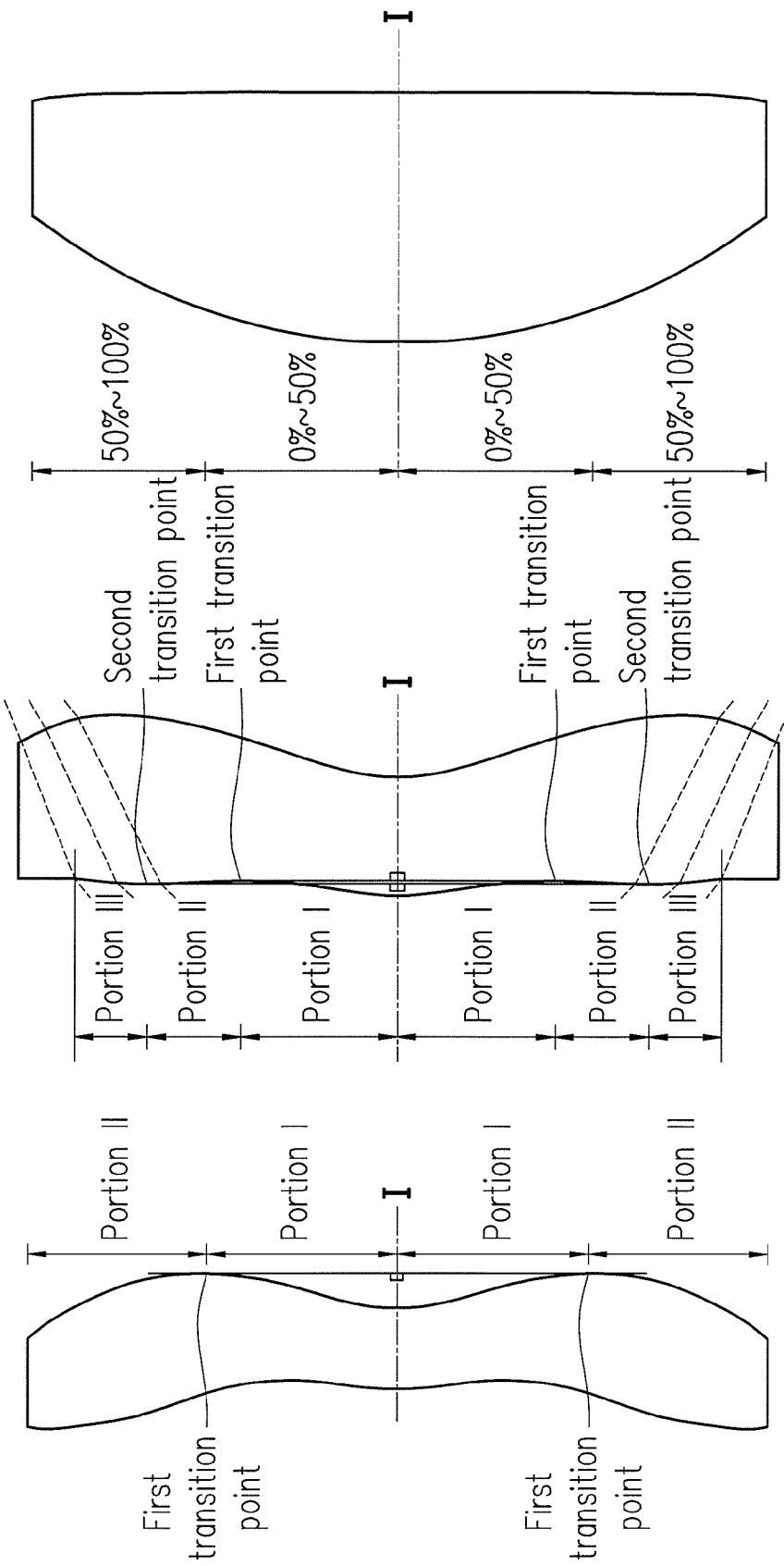

| First embodiment ||||||
|---|---|---|---|---|---|
| Effective focal length=0.850 mm , Half field of view=60.000°, f-number=2.686, System length=11.124 mm, Image height=0.843 mm ||||||
| Lens element | Surface | Radius of curvature (mm) | Thickness (mm) | Index of refraction | Abbe number | Focal length (mm) |
| Object | | Infinite | 600.200 | | | |
| First lens element 3 | Object-side surface 31 | 52.332 | 0.600 | 1.545 | 55.987 | -2.986 |
| | Image-side surface 32 | 1.550 | 2.974 | | | |
| Second lens element 4 | Object-side surface 41 | -3.173 | 2.560 | 1.517 | 64.198 | 3.613 |
| | Image-side surface 42 | -1.483 | 0.050 | | | |
| Aperture stop 2 | | Infinite | 0.180 | | | |
| Third lens element 5 | Object-side surface 51 | -5.420 | 2.137 | 1.545 | 55.987 | 3.063 |
| | Image-side surface 52 | -1.436 | 1.423 | | | |
| Fourth lens element 6 | Object-side surface 61 | -60.195 | 0.255 | 1.661 | 20.401 | -1679.683 |
| | Image-side surface 62 | -63.882 | 0.275 | | | |
| Cover glass 9 | Object-side surface 91 | Infinite | 0.300 | 1.517 | 64.167 | |
| | Image-side surface 92 | Infinite | 0.369 | | | |
| | Image plane 100 | Infinite | | | | |

FIG. 8

| Surface | K | $a_4$ | $a_6$ | $a_8$ | $a_{10}$ |
|---|---|---|---|---|---|
| 31 | 0.000000E+00 | 1.147648E-03 | 0.000000E+00 | 0.000000E+00 | 0.000000E+00 |
| 32 | 0.000000E+00 | -1.581197E-02 | -4.459556E-05 | -1.807029E-03 | 0.000000E+00 |
| 51 | 0.000000E+00 | -1.572899E-01 | 2.095467E-01 | -1.576828E+00 | 2.902036E+00 |
| 52 | 0.000000E+00 | -2.408897E-02 | 3.587934E-02 | -2.491308E-02 | 1.733189E-02 |
| 61 | 0.000000E+00 | -3.495809E-01 | 6.803597E-02 | 8.486817E-02 | 8.445443E-02 |
| 62 | 0.000000E+00 | -2.485771E-01 | 1.050687E-01 | -2.986311E-02 | -3.576553E-04 |
| Surface | $a_{12}$ | | | | |
| 31 | 0.000000E+00 | | | | |
| 32 | 0.000000E+00 | | | | |
| 51 | 0.000000E+00 | | | | |
| 52 | 0.000000E+00 | | | | |
| 61 | 0.000000E+00 | | | | |
| 62 | 8.737413E-02 | | | | |

FIG. 9

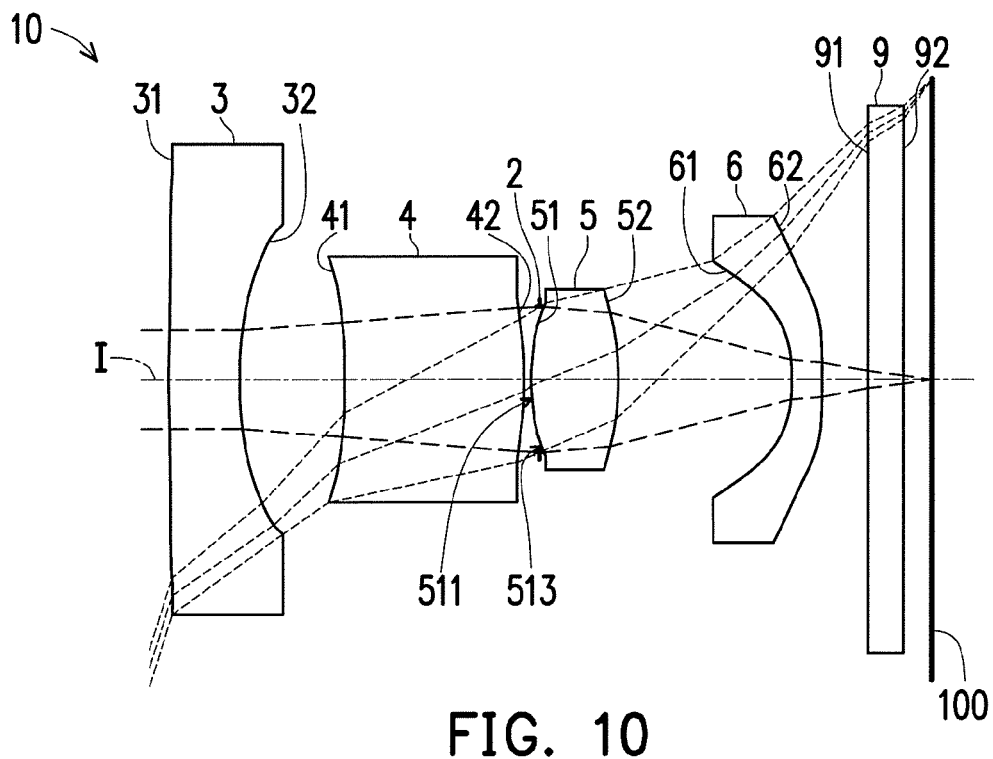
FIG. 10
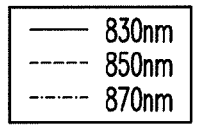
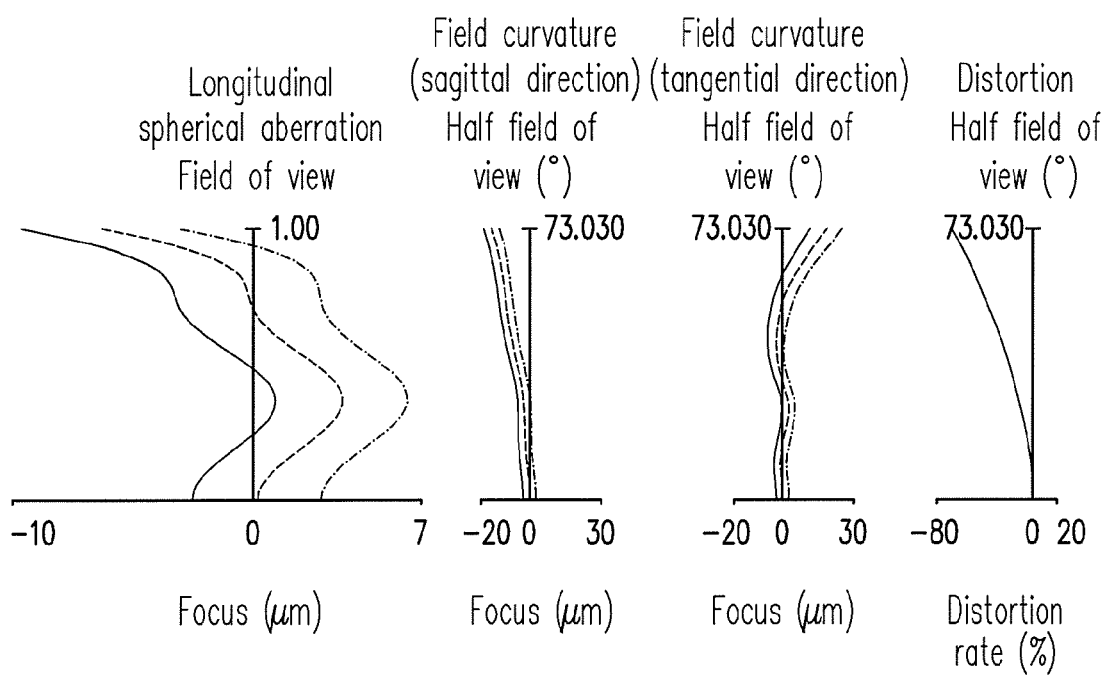
FIG. 11A   FIG. 11B   FIG. 11C   FIG. 11D

| Second embodiment | | | | | | |
|---|---|---|---|---|---|---|
| Effective focal length=2.474 mm, Half field of view=73.030°, f-number=2.839, System length=6.586 mm, Image height=2.579 mm | | | | | | |
| Lens element | Surface | Radius of curvature (mm) | Thickness (mm) | Index of refraction | Abbe number | Focal length (mm) |
| Object | | Infinite | 600.200 | | | |
| First lens element 3 | Object-side surface 31 | 70.000 | 0.600 | 1.545 | 55.987 | -6.830 |
| | Image-side surface 32 | 3.474 | 0.915 | | | |
| Second lens element 4 | Object-side surface 41 | -5.773 | 1.543 | 1.545 | 55.987 | 14.962 |
| | Image-side surface 42 | -3.673 | 0.134 | | | |
| Aperture stop 2 | | Infinite | -0.065 | | | |
| Third lens element 5 | Object-side surface 51 | 1.989 | 0.748 | 1.517 | 64.198 | 2.312 |
| | Image-side surface 52 | -2.526 | 1.506 | | | |
| Fourth lens element 6 | Object-side surface 61 | -1.484 | 0.258 | 1.661 | 20.401 | -2.736 |
| | Image-side surface 62 | -10.579 | 0.400 | | | |
| Cover glass 9 | Object-side surface 91 | Infinite | 0.300 | 1.517 | 64.167 | |
| | Image-side surface 92 | Infinite | 0.249 | | | |
| | Image plane 100 | Infinite | | | | |

FIG. 12

| Surface | K | $a_4$ | $a_6$ | $a_8$ | $a_{10}$ |
|---|---|---|---|---|---|
| 31 | 0.000000E+00 | 0.000000E+00 | 0.000000E+00 | 0.000000E+00 | 0.000000E+00 |
| 32 | 0.000000E+00 | 2.004757E-02 | 3.852411E-03 | 6.577935E-04 | -2.475685E-03 |
| 41 | 0.000000E+00 | -3.579587E-02 | -5.870901E-03 | 6.414260E-03 | -2.221541E-03 |
| 42 | 0.000000E+00 | 2.054194E-02 | -4.549566E-02 | 1.793862E-01 | 7.892832E-02 |
| 61 | 0.000000E+00 | -4.245716E-01 | 1.872205E-01 | 9.040910E-02 | -2.351695E-01 |
| 62 | 0.000000E+00 | -3.908606E-01 | 3.494891E-01 | -2.546682E-01 | 1.586984E-01 |
| Surface | $a_{12}$ | $a_{14}$ | $a_{16}$ | | |
| 31 | 0.000000E+00 | 0.000000E+00 | 0.000000E+00 | | |
| 32 | 3.842794E-03 | -2.012218E-03 | 4.441151E-04 | | |
| 41 | 3.476109E-04 | 1.277781E-04 | -1.505832E-04 | | |
| 42 | -1.551557E+00 | 3.145713E+00 | -2.055019E+00 | | |
| 61 | 9.465857E-02 | 9.163712E-02 | -8.484782E-02 | | |
| 62 | -6.220531E-02 | 1.254047E-02 | -9.432812E-04 | | |

FIG. 13

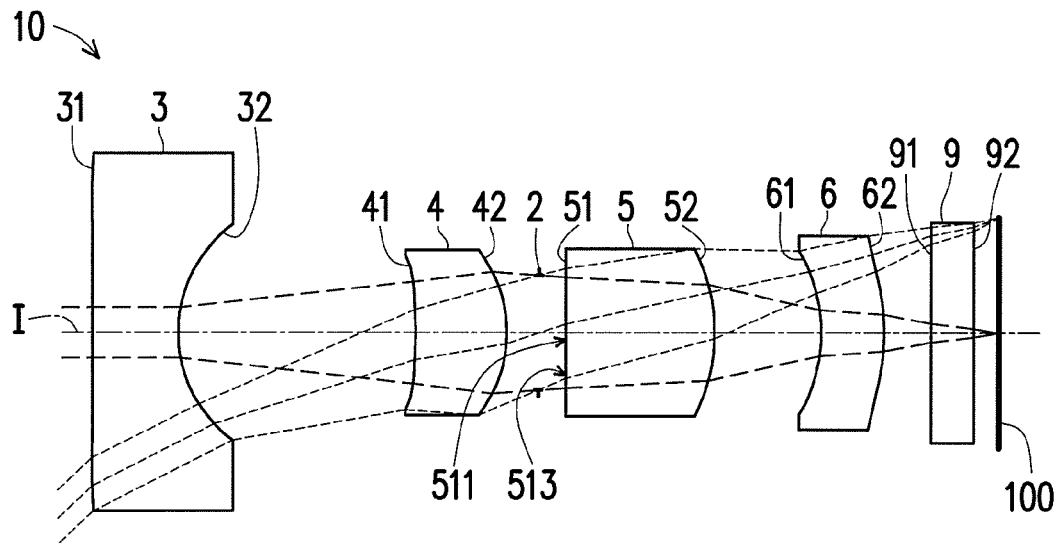
FIG. 14
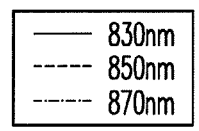
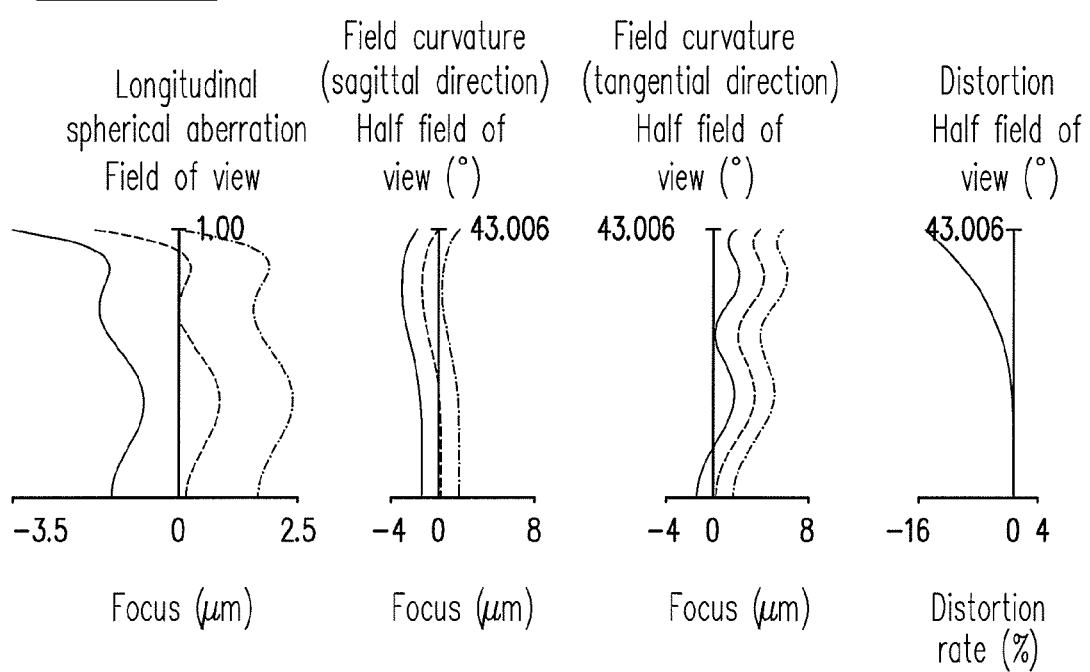
FIG. 15A  FIG. 15B  FIG. 15C  FIG. 15D

| Third embodiment ||||||
|---|---|---|---|---|---|
| Effective focal length=0.997 mm , Half field of view=43.006°, f-number=2.800, System length=6.300 mm, Image height=0.791 mm ||||||
| Lens element | Surface | Radius of curvature (mm) | Thickness (mm) | Index of refraction | Abbe number | Focal length (mm) |
| Object |  | Infinite | 600.200 |  |  |  |
| First lens element 3 | Object-side surface 31 | 69.916 | 0.603 | 1.545 | 55.987 | -1.674 |
|  | Image-side surface 32 | 0.888 | 1.644 |  |  |  |
| Second lens element 4 | Object-side surface 41 | -4.000 | 0.631 | 1.545 | 55.987 | 2.065 |
|  | Image-side surface 42 | -0.919 | 0.225 |  |  |  |
| Aperture stop 2 |  | Infinite | 0.180 |  |  |  |
| Third lens element 5 | Object-side surface 51 | 216.064 | 1.044 | 1.517 | 64.198 | 2.483 |
|  | Image-side surface 52 | -1.271 | 0.741 |  |  |  |
| Fourth lens element 6 | Object-side surface 61 | -0.979 | 0.435 | 1.661 | 20.401 | -15.559 |
|  | Image-side surface 62 | -1.274 | 0.322 |  |  |  |
| Cover glass 9 | Object-side surface 91 | Infinite | 0.300 | 1.517 | 64.167 |  |
|  | Image-side surface 92 | Infinite | 0.176 |  |  |  |
|  | Image plane 100 | Infinite |  |  |  |  |

FIG. 16

| Surface | K | $a_4$ | $a_6$ | $a_8$ | $a_{10}$ |
|---|---|---|---|---|---|
| 31 | 0.000000E+00 | 0.000000E+00 | 0.000000E+00 | 0.000000E+00 | 0.000000E+00 |
| 32 | -2.493120E-02 | -6.748260E-02 | -5.794648E-03 | -1.761684E-01 | 5.440310E-01 |
| 41 | 3.612328E+00 | -3.158072E-01 | 2.126105E-02 | -1.229872E+00 | 4.985500E+00 |
| 42 | 1.051808E-02 | 5.422914E-02 | -3.442738E-02 | 7.454010E-01 | -1.276764E+00 |
| 61 | -1.295271E-01 | 3.961223E-01 | 2.934171E-01 | -3.213830E+00 | 2.985606E+00 |
| 62 | -3.112812E-01 | 5.579624E-01 | -7.023329E-02 | -6.358569E-01 | -1.171468E+00 |
| Surface | $a_{12}$ | $a_{14}$ | $a_{16}$ | | |
| 31 | 0.000000E+00 | 0.000000E+00 | 0.000000E+00 | | |
| 32 | -1.808888E-01 | -1.576556E+00 | 2.015181E+00 | | |
| 41 | -1.260423E+00 | -4.990520E+01 | 8.867577E+01 | | |
| 42 | -4.785884E+00 | 1.712855E+01 | -1.246981E+01 | | |
| 61 | 8.447281E+00 | -1.926809E+01 | 5.633132E+00 | | |
| 62 | 5.547006E-01 | 8.077744E+00 | -9.805929E+00 | | |

FIG. 17

| Fourth embodiment |||||||
|---|---|---|---|---|---|---|
| Effective focal length=1.825 mm, Half field of view=73.000°, f-number=2.842, System length=9.644 mm, Image height=2.041 mm |||||||
| Lens element | Surface | Radius of curvature (mm) | Thickness (mm) | Index of refraction | Abbe number | Focal length (mm) |
| Object | | Infinite | 600.200 | | | |
| First lens element 3 | Object-side surface 31 | 70.000 | 0.188 | 1.545 | 55.987 | -3.140 |
| | Image-side surface 32 | 1.645 | 1.480 | | | |
| Second lens element 4 | Object-side surface 41 | -11.928 | 2.488 | 1.545 | 55.987 | 5.091 |
| | Image-side surface 42 | -2.386 | 1.019 | | | |
| Aperture stop 2 | | Infinite | -0.051 | | | |
| Third lens element 5 | Object-side surface 51 | 2.855 | 1.816 | 1.517 | 64.198 | 3.738 |
| | Image-side surface 52 | -4.500 | 1.486 | | | |
| Fourth lens element 6 | Object-side surface 61 | -78.015 | 0.253 | 1.661 | 20.401 | -7.410 |
| | Image-side surface 62 | 5.040 | 0.400 | | | |
| Cover glass 9 | Object-side surface 91 | Infinite | 0.300 | 1.517 | 64.167 | |
| | Image-side surface 92 | Infinite | 0.265 | | | |
| | Image plane 100 | Infinite | | | | |

FIG. 20

| Surface | K | $a_4$ | $a_6$ | $a_8$ | $a_{10}$ |
|---|---|---|---|---|---|
| 31 | 0.000000E+00 | 0.000000E+00 | 0.000000E+00 | 0.000000E+00 | 0.000000E+00 |
| 32 | 0.000000E+00 | -1.458010E-02 | -1.231294E-03 | -6.767792E-04 | -1.099898E-04 |
| 41 | 0.000000E+00 | -2.968967E-02 | 9.691122E-04 | -7.334783E-04 | -6.887633E-04 |
| 42 | 0.000000E+00 | 1.863433E-03 | 2.493242E-03 | -3.230416E-03 | 4.608121E-03 |
| 61 | 0.000000E+00 | -2.219525E-01 | 1.964851E-02 | -1.765053E-02 | 4.999912E-03 |
| 62 | 0.000000E+00 | -1.624272E-01 | 2.377311E-02 | -4.740202E-03 | 1.024506E-03 |
| Surface | $a_{12}$ | $a_{14}$ | $a_{16}$ | | |
| 31 | 0.000000E+00 | 0.000000E+00 | 0.000000E+00 | | |
| 32 | 3.703105E-05 | -7.819053E-06 | -1.408035E-05 | | |
| 41 | 3.314349E-04 | 4.083655E-05 | -4.834002E-05 | | |
| 42 | -3.859839E-03 | 1.569313E-03 | -2.429613E-04 | | |
| 61 | 1.695665E-03 | 2.576703E-04 | -1.848513E-05 | | |
| 62 | 1.418673E-04 | 5.147460E-05 | -1.396016E-05 | | |

FIG. 21

| Fifth embodiment |||||||
|---|---|---|---|---|---|---|
| Effective focal length=1.774 mm , Half field of view=73.031°, f-number=2.845, System length=9.263 mm, Image height=2.156 mm |||||||
| Lens element | Surface | Radius of curvature (mm) | Thickness (mm) | Index of refraction | Abbe number | Focal length (mm) |
| Object | | Infinite | 600.200 | | | |
| First lens element 3 | Object-side surface 31 | 70.000 | 1.292 | 1.545 | 55.987 | -2.694 |
| | Image-side surface 32 | 1.408 | 1.820 | | | |
| Second lens element 4 | Object-side surface 41 | -4.648 | 1.134 | 1.545 | 55.987 | 5.227 |
| | Image-side surface 42 | -1.899 | 0.260 | | | |
| Aperture stop 2 | | Infinite | -0.050 | | | |
| Third lens element 5 | Object-side surface 51 | 2.921 | 1.816 | 1.517 | 64.198 | 3.215 |
| | Image-side surface 52 | -2.951 | 1.395 | | | |
| Fourth lens element 6 | Object-side surface 61 | -3.759 | 0.696 | 1.661 | 20.401 | -7.137 |
| | Image-side surface 62 | -23.099 | 0.400 | | | |
| Cover glass 9 | Object-side surface 91 | Infinite | 0.300 | 1.517 | 64.167 | |
| | Image-side surface 92 | Infinite | 0.200 | | | |
| Image plane 100 | | Infinite | | | | |

FIG. 24

| Surface | K | $a_4$ | $a_6$ | $a_8$ | $a_{10}$ |
|---|---|---|---|---|---|
| 31 | 0.000000E+00 | 0.000000E+00 | 0.000000E+00 | 0.000000E+00 | 0.000000E+00 |
| 32 | 0.000000E+00 | -3.967034E-03 | 3.593665E-03 | -4.823754E-03 | -3.513131E-04 |
| 41 | 0.000000E+00 | -5.365285E-02 | 2.144511E-04 | -7.078382E-03 | 2.365821E-04 |
| 42 | 0.000000E+00 | -6.313781E-03 | 3.679508E-03 | -2.578590E-03 | 1.184174E-03 |
| 61 | 0.000000E+00 | -1.376290E-01 | 1.547141E-02 | -1.763716E-02 | 2.652475E-03 |
| 62 | 0.000000E+00 | -1.104653E-01 | 3.230741E-02 | -6.018392E-03 | 5.281882E-04 |
| Surface | $a_{12}$ | $a_{14}$ | $a_{16}$ | | |
| 31 | 0.000000E+00 | 0.000000E+00 | 0.000000E+00 | | |
| 32 | 5.450890E-04 | 4.176891E-04 | -3.022058E-04 | | |
| 41 | 2.761916E-03 | 7.381020E-04 | -2.267350E-03 | | |
| 42 | 2.214130E-03 | -3.160693E-03 | 5.375421E-04 | | |
| 61 | 3.314169E-04 | 1.459166E-04 | 1.606730E-04 | | |
| 62 | 1.189499E-04 | 4.346305E-05 | -1.517422E-05 | | |

FIG. 25

| Sixth embodiment ||||||
|---|---|---|---|---|---|
| Effective focal length=1.062 mm , Half field of view=73.055°, f-number=2.800, System length=14.219 mm, Image height=1.019 mm ||||||
| Lens element | Surface | Radius of curvature (mm) | Thickness (mm) | Index of refraction | Abbe number | Focal length (mm) |
| Object | | Infinite | 600.200 | | | |
| First lens element 3 | Object-side surface 31 | 70.000 | 0.600 | 1.545 | 55.987 | -5.882 |
| | Image-side surface 32 | 3.013 | 9.334 | | | |
| Second lens element 4 | Object-side surface 41 | -7.224 | 0.665 | 1.545 | 55.987 | 5.090 |
| | Image-side surface 42 | -2.047 | 0.225 | | | |
| Aperture stop 2 | | Infinite | 0.180 | | | |
| Third lens element 5 | Object-side surface 51 | 3.395 | 1.073 | 1.517 | 64.198 | 2.228 |
| | Image-side surface 52 | -1.526 | 0.751 | | | |
| Fourth lens element 6 | Object-side surface 61 | -0.878 | 0.450 | 1.661 | 20.401 | -2.570 |
| | Image-side surface 62 | -2.265 | 0.271 | | | |
| Cover glass 9 | Object-side surface 91 | Infinite | 0.300 | 1.517 | 64.167 | |
| | Image-side surface 92 | Infinite | 0.370 | | | |
| | Image plane 100 | Infinite | | | | |

FIG. 28

| Surface | K | $a_4$ | $a_6$ | $a_8$ | $a_{10}$ |
|---|---|---|---|---|---|
| 31 | 0.000000E+00 | 0.000000E+00 | 0.000000E+00 | 0.000000E+00 | 0.000000E+00 |
| 32 | 0.000000E+00 | 1.637407E-03 | -5.641011E-05 | 1.362332E-05 | 0.000000E+00 |
| 41 | 0.000000E+00 | -1.047620E-01 | 1.038572E-02 | 3.976302E-02 | 0.000000E+00 |
| 42 | 0.000000E+00 | -1.496716E-02 | 1.694485E-02 | 1.160447E-01 | -1.121467E-01 |
| 61 | 0.000000E+00 | 1.870669E-01 | 2.686643E-01 | -4.049297E-02 | 0.000000E+00 |
| 62 | 0.000000E+00 | 2.135588E-02 | 9.465734E-02 | -6.755037E-03 | -7.774659E-02 |
| Surface | $a_{12}$ | $a_{14}$ | $a_{16}$ | | |
| 31 | 0.000000E+00 | 0.000000E+00 | 0.000000E+00 | | |
| 32 | 0.000000E+00 | 0.000000E+00 | 0.000000E+00 | | |
| 41 | 0.000000E+00 | 0.000000E+00 | 0.000000E+00 | | |
| 42 | 0.000000E+00 | 0.000000E+00 | 0.000000E+00 | | |
| 61 | 0.000000E+00 | 0.000000E+00 | 0.000000E+00 | | |
| 62 | 0.000000E+00 | 0.000000E+00 | 0.000000E+00 | | |

FIG. 29

| Seventh embodiment |||||||
|---|---|---|---|---|---|---|
| Effective focal length=1.830 mm , Half field of view=73.000°, f-number=2.863, System length=9.074 mm, Image height=2.140 mm |||||||
| Lens element | Surface | Radius of curvature (mm) | Thickness (mm) | Index of refraction | Abbe number | Focal length (mm) |
| Object | | Infinite | 600.200 | | | |
| First lens element 3 | Object-side surface 31 | 70.000 | 0.195 | 1.545 | 55.987 | -3.215 |
| | Image-side surface 32 | 1.683 | 2.446 | | | |
| Second lens element 4 | Object-side surface 41 | -7.068 | 1.140 | 1.545 | 55.987 | 5.469 |
| | Image-side surface 42 | -2.192 | 1.065 | | | |
| Aperture stop 2 | | Infinite | -0.033 | | | |
| Third lens element 5 | Object-side surface 51 | 3.713 | 0.953 | 1.517 | 64.198 | 3.829 |
| | Image-side surface 52 | -3.760 | 2.149 | | | |
| Fourth lens element 6 | Object-side surface 61 | -121.712 | 0.200 | 1.661 | 20.401 | -10.978 |
| | Image-side surface 62 | 7.437 | 0.400 | | | |
| Cover glass 9 | Object-side surface 91 | Infinite | 0.300 | 1.517 | 64.167 | |
| | Image-side surface 92 | Infinite | 0.258 | | | |
| | Image plane 100 | Infinite | | | | |

FIG. 32

| Surface | K | $a_4$ | $a_6$ | $a_8$ | $a_{10}$ |
|---|---|---|---|---|---|
| 31 | 0.000000E+00 | 0.000000E+00 | 0.000000E+00 | 0.000000E+00 | 0.000000E+00 |
| 32 | 0.000000E+00 | -9.442145E-03 | 5.461505E-03 | -9.504991E-03 | 8.272208E-03 |
| 41 | 0.000000E+00 | -4.753782E-02 | 1.694344E-02 | -3.981275E-02 | 5.029896E-02 |
| 42 | 0.000000E+00 | -8.778046E-03 | 3.823827E-03 | -1.225796E-03 | -1.960085E-03 |
| 61 | 0.000000E+00 | -1.301373E-01 | -1.191746E-01 | -2.858655E-01 | 8.252455E-01 |
| 62 | 0.000000E+00 | -2.719977E-02 | -3.100829E-01 | 2.956884E-01 | -1.276509E-01 |
| Surface | $a_{12}$ | $a_{14}$ | $a_{16}$ | | |
| 31 | 0.000000E+00 | 0.000000E+00 | 0.000000E+00 | | |
| 32 | -4.157116E-03 | 1.110766E-03 | -1.302267E-04 | | |
| 41 | -3.826303E-02 | 1.548084E-02 | -2.638718E-03 | | |
| 42 | 2.047372E-03 | -7.940174E-04 | 1.032356E-04 | | |
| 61 | -8.967201E-01 | 4.482373E-01 | -8.339694E-02 | | |
| 62 | 1.973756E-04 | 1.787730E-02 | -3.863420E-03 | | |

FIG. 33

| Eighth embodiment |||||||
|---|---|---|---|---|---|---|
| Effective focal length=1.701 mm , Half field of view=68.032°, f-number=2.731, System length=9.536 mm, Image height=1.843 mm |||||||
| Lens element | Surface | Radius of curvature (mm) | Thickness (mm) | Index of refraction | Abbe number | Focal length (mm) |
| Object | | Infinite | 600.200 | | | |
| First lens element 3 | Object-side surface 31 | 70.000 | 0.600 | 1.545 | 55.987 | -3.018 |
| | Image-side surface 32 | 1.579 | 2.909 | | | |
| Second lens element 4 | Object-side surface 41 | 23.931 | 1.062 | 1.545 | 55.987 | 3.211 |
| | Image-side surface 42 | -1.829 | 0.225 | | | |
| Aperture stop 2 | | Infinite | 0.180 | | | |
| Third lens element 5 | Object-side surface 51 | 6.145 | 2.641 | 1.517 | 64.198 | 3.631 |
| | Image-side surface 52 | -2.264 | 0.714 | | | |
| Fourth lens element 6 | Object-side surface 61 | -1.372 | 0.258 | 1.661 | 20.401 | -3.649 |
| | Image-side surface 62 | -3.586 | 0.400 | | | |
| Cover glass 9 | Object-side surface 91 | Infinite | 0.300 | 1.517 | 64.167 | |
| | Image-side surface 92 | Infinite | 0.247 | | | |
| | Image plane 100 | Infinite | | | | |

FIG. 36

| Surface | K | $a_4$ | $a_6$ | $a_8$ | $a_{10}$ |
|---|---|---|---|---|---|
| 31 | 0.000000E+00 | 0.000000E+00 | 0.000000E+00 | 0.000000E+00 | 0.000000E+00 |
| 32 | 0.000000E+00 | 3.802424E-03 | -1.351848E-02 | 2.653160E-02 | -2.811300E-02 |
| 41 | 0.000000E+00 | -5.259572E-02 | 3.446587E-03 | -5.224628E-02 | 5.841496E-02 |
| 42 | 0.000000E+00 | -5.501965E-03 | -1.640476E-03 | -9.544718E-03 | 9.719481E-03 |
| 61 | 0.000000E+00 | 3.058089E-02 | 6.840929E-02 | -6.874908E-02 | 3.918640E-02 |
| 62 | 0.000000E+00 | 1.532380E-02 | 2.975678E-02 | -2.413309E-02 | 6.154049E-03 |
| Surface | $a_{12}$ | $a_{14}$ | $a_{16}$ | | |
| 31 | 0.000000E+00 | 0.000000E+00 | 0.000000E+00 | | |
| 32 | 1.650495E-02 | -5.062447E-03 | 6.350426E-04 | | |
| 41 | -3.607105E-02 | 2.737706E-03 | 1.742731E-03 | | |
| 42 | -7.698199E-03 | 3.129495E-03 | -3.650751E-04 | | |
| 61 | 8.533032E-04 | -9.090860E-03 | 3.319960E-03 | | |
| 62 | 1.978980E-03 | -1.483536E-03 | 2.359582E-04 | | |

FIG. 37

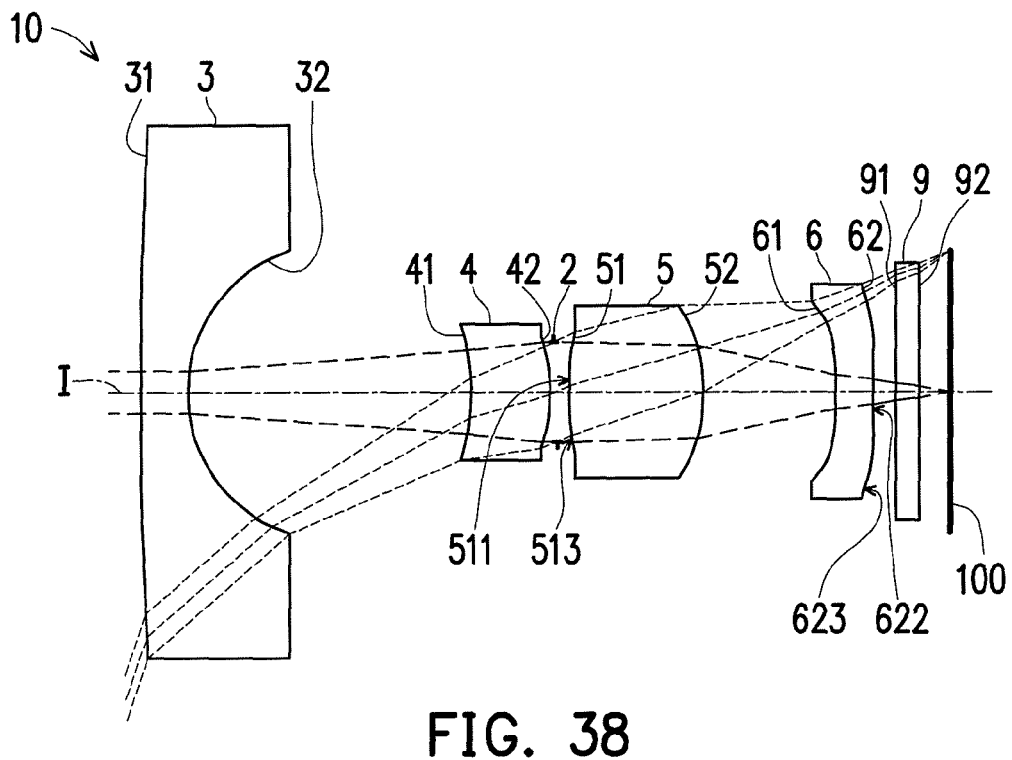
FIG. 38
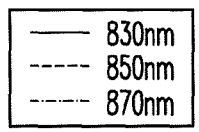
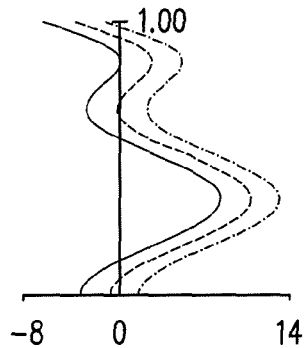
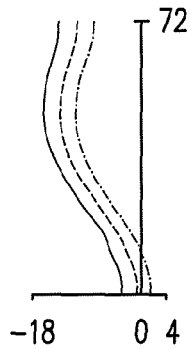
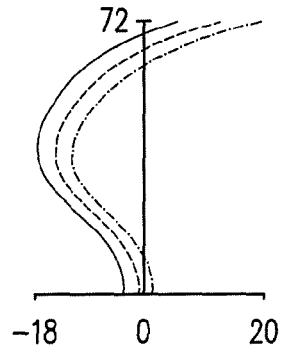
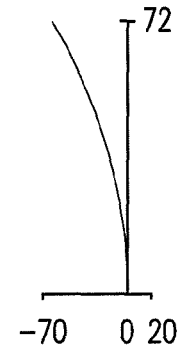
FIG. 39A  FIG. 39B  FIG. 39C  FIG. 39D

| Ninth embodiment | | | | | | |
|---|---|---|---|---|---|---|
| Effective focal length=1.496 mm , Half field of view=72.000°, f-number=2.746, System length=10.128 mm, Image height=1.745 mm | | | | | | |
| Lens element | Surface | Radius of curvature (mm) | Thickness (mm) | Index of refraction | Abbe number | Focal length (mm) |
| Object | | Infinite | 600.200 | | | |
| First lens element 3 | Object-side surface 31 | 52.344 | 0.600 | 1.517 | 64.198 | -3.833 |
| | Image-side surface 32 | 1.877 | 3.535 | | | |
| Second lens element 4 | Object-side surface 41 | -2.987 | 1.000 | 1.517 | 64.198 | 12.935 |
| | Image-side surface 42 | -2.288 | 0.050 | | | |
| Aperture stop 2 | | Infinite | 0.180 | | | |
| Third lens element 5 | Object-side surface 51 | 3.373 | 1.673 | 1.545 | 55.987 | 2.932 |
| | Image-side surface 52 | -2.417 | 1.663 | | | |
| Fourth lens element 6 | Object-side surface 61 | -58.944 | 0.465 | 1.661 | 20.401 | -8.634 |
| | Image-side surface 62 | 6.037 | 0.290 | | | |
| Cover glass 9 | Object-side surface 91 | Infinite | 0.300 | 1.517 | 64.167 | |
| | Image-side surface 92 | Infinite | 0.371 | | | |
| | Image plane 100 | Infinite | | | | |

FIG. 40

| Surface | K | $a_4$ | $a_6$ | $a_8$ | $a_{10}$ |
|---|---|---|---|---|---|
| 51 | 0.000000E+00 | -6.360946E-02 | 2.196227E-01 | -9.597712E-01 | 1.666677E+00 |
| 52 | 0.000000E+00 | -3.144226E-02 | 1.493896E-02 | -2.907297E-02 | 1.458210E-02 |
| 61 | 0.000000E+00 | -1.951033E-01 | 2.396465E-02 | -2.091274E-02 | 6.280147E-03 |
| 62 | 0.000000E+00 | -1.666807E-01 | 5.499543E-02 | -1.689681E-02 | 6.573890E-03 |
| Surface | $a_{12}$ | $a_{14}$ | $a_{16}$ | | |
| 51 | -3.960895E-01 | -2.078977E+00 | 1.702754E+00 | | |
| 52 | 8.492726E-04 | -1.879146E-03 | -4.159495E-04 | | |
| 61 | 3.401739E-03 | 1.147579E-03 | -4.490185E-04 | | |
| 62 | -1.803599E-04 | -5.915004E-05 | -3.064494E-05 | | |

FIG. 41

| Conditional expression | First embodiment | Second embodiment | Third embodiment | Fourth embodiment | Fifth embodiment |
|---|---|---|---|---|---|
| T1 | 0.600 | 0.600 | 0.603 | 0.188 | 1.292 |
| G12 | 2.974 | 0.915 | 1.644 | 1.480 | 1.820 |
| T2 | 2.560 | 1.543 | 0.631 | 2.488 | 1.134 |
| G23 | 0.230 | 0.069 | 0.405 | 0.969 | 0.210 |
| T3 | 2.137 | 0.748 | 1.044 | 1.816 | 1.816 |
| G34 | 1.423 | 1.506 | 0.741 | 1.486 | 1.395 |
| T4 | 0.255 | 0.258 | 0.435 | 0.253 | 0.696 |
| G4C | 0.275 | 0.400 | 0.322 | 0.400 | 0.400 |
| TC | 0.300 | 0.300 | 0.300 | 0.300 | 0.300 |
| GCP | 0.369 | 0.249 | 0.176 | 0.265 | 0.200 |
| BFL | 0.945 | 0.949 | 0.798 | 0.965 | 0.900 |
| ALT | 5.552 | 3.148 | 2.712 | 4.745 | 4.939 |
| AAG | 4.627 | 2.489 | 2.789 | 3.934 | 3.425 |
| TTL | 11.124 | 6.586 | 6.300 | 9.644 | 9.263 |
| ALT/G12 | 1.867 | 3.442 | 1.650 | 3.207 | 2.714 |
| ALT/T2 | 2.168 | 2.041 | 4.298 | 1.907 | 4.354 |
| ALT/T3 | 2.598 | 4.211 | 2.598 | 2.613 | 2.719 |
| ALT/G34 | 3.902 | 2.091 | 3.661 | 3.194 | 3.540 |
| ALT/AAG | 1.200 | 1.265 | 0.972 | 1.206 | 1.442 |
| EFL/G12 | 0.286 | 2.705 | 0.606 | 1.233 | 0.975 |
| EFL/T2 | 0.332 | 1.604 | 1.579 | 0.733 | 1.564 |
| EFL/T3 | 0.398 | 3.309 | 0.955 | 1.005 | 0.977 |
| EFL/G34 | 0.597 | 1.643 | 1.345 | 1.228 | 1.271 |
| EFL/AAG | 0.184 | 0.994 | 0.357 | 0.464 | 0.518 |
| (T1+G23+T4)/T2 | 0.424 | 0.601 | 2.285 | 0.567 | 1.938 |
| (T1+G23+T4)/G34 | 0.762 | 0.616 | 1.946 | 0.949 | 1.575 |
| (T1+G23+T4)/AAG | 0.234 | 0.372 | 0.517 | 0.358 | 0.642 |
| (T1+T4)/G12 | 0.287 | 0.938 | 0.631 | 0.298 | 1.093 |
| (T1+T4)/T2 | 0.334 | 0.556 | 1.644 | 0.177 | 1.753 |
| (T1+T4)/G34 | 0.601 | 0.570 | 1.400 | 0.297 | 1.425 |
| (T1+T4)/AAG | 0.185 | 0.345 | 0.372 | 0.112 | 0.581 |

FIG. 42

| Conditional expression | Sixth embodiment | Seventh embodiment | Eighth embodiment | Ninth embodiment |
| --- | --- | --- | --- | --- |
| T1 | 0.600 | 0.195 | 0.600 | 0.600 |
| G12 | 9.334 | 2.446 | 2.909 | 3.535 |
| T2 | 0.665 | 1.140 | 1.062 | 1.000 |
| G23 | 0.405 | 1.032 | 0.405 | 0.230 |
| T3 | 1.073 | 0.953 | 2.641 | 1.673 |
| G34 | 0.751 | 2.149 | 0.714 | 1.663 |
| T4 | 0.450 | 0.200 | 0.258 | 0.465 |
| G4C | 0.271 | 0.400 | 0.400 | 0.290 |
| TC | 0.300 | 0.300 | 0.300 | 0.300 |
| GCP | 0.370 | 0.258 | 0.247 | 0.371 |
| BFL | 0.941 | 0.958 | 0.947 | 0.961 |
| ALT | 2.788 | 2.490 | 4.561 | 3.739 |
| AAG | 10.490 | 5.626 | 4.028 | 5.428 |
| TTL | 14.219 | 9.074 | 9.536 | 10.128 |
| ALT/G12 | 0.299 | 1.018 | 1.568 | 1.058 |
| ALT/T2 | 4.194 | 2.183 | 4.295 | 3.738 |
| ALT/T3 | 2.598 | 2.611 | 1.727 | 2.234 |
| ALT/G34 | 3.714 | 1.159 | 6.391 | 2.248 |
| ALT/AAG | 0.266 | 0.443 | 1.132 | 0.689 |
| EFL/G12 | 0.114 | 0.748 | 0.585 | 0.423 |
| EFL/T2 | 1.597 | 1.605 | 1.602 | 1.496 |
| EFL/T3 | 0.990 | 1.920 | 0.644 | 0.894 |
| EFL/G34 | 1.415 | 0.852 | 2.383 | 0.899 |
| EFL/AAG | 0.101 | 0.325 | 0.422 | 0.276 |
| (T1+G23+T4)/T2 | 2.189 | 1.252 | 1.190 | 1.296 |
| (T1+G23+T4)/G34 | 1.939 | 0.664 | 1.770 | 0.779 |
| (T1+G23+T4)/AAG | 0.139 | 0.254 | 0.314 | 0.239 |
| (T1+T4)/G12 | 0.112 | 0.162 | 0.295 | 0.301 |
| (T1+T4)/T2 | 1.579 | 0.347 | 0.808 | 1.065 |
| (T1+T4)/G34 | 1.399 | 0.184 | 1.203 | 0.641 |
| (T1+T4)/AAG | 0.100 | 0.070 | 0.213 | 0.196 |

FIG. 43

OPTICAL LENS ASSEMBLY

CROSS-REFERENCE TO RELATED APPLICATION

This application claims the priority benefit of China application serial no. 201610520795.8, filed on Jul. 5, 2016. The entirety of the above-mentioned patent application is hereby incorporated by reference herein and made a part of this specification.

BACKGROUND OF THE INVENTION

Field of the Invention
The invention relates to an optical lens assembly.
Description of Related Art
In recent years, the popularity of mobile products such as mobile phones and digital cameras allowed the rigorous development of imaging module-related techniques, and the imaging module mainly contains elements such as an optical lens assembly, a module holder unit, and a sensor, and the thin and light developing trend of mobile phones and digital cameras also resulted in a greater demand of the compactness of the imaging module. With the advancement of the techniques of charge-coupled device (CCD) and complementary metal oxide semiconductor (CMOS) and reduction in size, the length of the optical lens assembly installed in the imaging module also needs to be correspondingly reduced. However, to prevent reduction in photographic effects and quality, when the length of the optical lens assembly is reduced, good optical performance still needs to be achieved. The most important feature of the optical lens assembly is expectedly imaging quality and size.

Specifications of mobile products (such as mobile phones, cameras, tablet computers, personal digital assistants, automotive video devices, and virtual reality trackers) are ever changing, and the key component thereof, the optical lens assembly, is also being more dynamically developed, and the application not only covers photography and video recording, but also includes, for instance, environmental monitoring and driving records recording, and with the advancement of image sensing techniques, consumer demand for, for instance, imaging quality is also increased. Therefore, the design of the optical lens assembly not only requires good imaging quality and smaller lens space, when driving in an environment of insufficient lighting, increase in the field of view and aperture size, infrared detection, and environment temperature stability are also important topics.

However, the optical lens assembly design cannot produce an optical lens assembly having both imaging quality and small size simply by reducing the ratio of, for instance, a lens having good imaging quality, and the design process involves material properties, and actual issues on the production line such as assembly yield also needs to be considered.

The technical difficulty of manufacturing a small lens is significantly greater than that of a traditional lens, and therefore how to manufacture an optical lens assembly satisfying consumer electronic product requirements and continuing to increase the imaging quality thereof have always been highly desired goals of production, government, and academia in the field.

SUMMARY OF THE INVENTION

The invention provides an optical lens assembly capable of maintaining good optical performance under the condition of a reduced lens system length.

An embodiment of the invention provides an optical lens assembly including a first lens element, a second lens element, a third lens element, and a fourth lens element from an object side to an image side in order along an optical axis. The first lens element to the fourth lens element each include an object-side surface facing the object side and allowing imaging rays to pass through and an image-side surface facing the image side and allowing the imaging rays to pass through. The object-side surface of the first lens element has a convex portion in a vicinity of the optical axis. The second lens element has positive refracting power, and the object-side surface of the second lens element has a concave portion in a vicinity of a periphery of the second lens element. The third lens element is made of glass having an Abbe number greater than 60. At least one of the object-side surface and the image-side surface of the fourth lens element is an aspheric surface. A quantity of lens elements having refracting power of the optical lens assembly is only four.

An embodiment of the invention provides an optical lens assembly including a first lens element, a second lens element, a third lens element, and a fourth lens element from an object side to an image side in order along an optical axis. The first lens element to the fourth lens element each include an object-side surface facing the object side and allowing imaging rays to pass through and an image-side surface facing the image side and allowing the imaging rays to pass through. The object-side surface of the first lens element has a convex portion in a vicinity of the optical axis. The object-side surface of the second lens element has a concave portion in a vicinity of a periphery of the second lens element, and the image-side surface of the second lens element has a convex portion in a vicinity of the periphery of the second lens element. The third lens element has refracting power. The object-side surface of the fourth lens element has a concave portion in a vicinity of the optical axis, and the image-side surface of the fourth lens element has a convex portion in a vicinity of a periphery of the fourth lens element. One of the second lens element and the third lens element is made of glass having an Abbe number greater than 60, and a quantity of lens elements having refracting power of the optical lens assembly is only four.

An embodiment of the invention provides an optical lens assembly including a first lens element, a second lens element, a third lens element, and a fourth lens element from an object side to an image side in order along an optical axis. The first lens element to the fourth lens element each include an object-side surface facing the object side and allowing imaging rays to pass through and an image-side surface facing the image side and allowing the imaging rays to pass through. The object-side surface of the first lens element has a convex portion in a vicinity of the optical axis. The object-side surface of the second lens element has a concave portion in a vicinity of a periphery of the second lens element. The third lens element is made of glass having an Abbe number greater than 60. At least one of the object-side surface and the image-side surface of the fourth lens element is an aspheric surface. A half field of view of the optical lens assembly is greater than 40 degrees, and a quantity of lens elements having refracting power of the optical lens assembly is only four.

Based on the above, the optical lens assembly of the embodiments of the invention has the following beneficial effects: via the concave and convex shape design and arrangement of the object-side surface or the image-side surface of the lens element, under the condition of a reduced system length, the optical lens assembly still has the optical performance of being capable of overcoming aberrations and provides good imaging quality.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a schematic describing the surface structure of the lens element of example 1.

FIG. 4 is a schematic describing the surface structure of the lens element of example 2.

FIG. 5 is a schematic describing the surface structure of the lens element of example 3.

FIG. 8 shows detailed optical data of the optical lens assembly of the first embodiment of the invention.

FIG. 9 shows aspheric surface parameters of the optical lens assembly of the first embodiment of the invention.

FIG. 10 is a schematic of an optical lens assembly of the second embodiment of the invention.

FIG. 11A to FIG. 11D are diagrams of the longitudinal spherical aberration and various aberrations of the optical lens assembly of the second embodiment.

FIG. 12 shows detailed optical data of the optical lens assembly of the second embodiment of the invention.

FIG. 13 shows aspheric surface parameters of the optical lens assembly of the second embodiment of the invention.

FIG. 14 is a schematic of an optical lens assembly of the third embodiment of the invention.

FIG. 15A to FIG. 15D are diagrams of the longitudinal spherical aberration and various aberrations of the optical lens assembly of the third embodiment.

FIG. 16 shows detailed optical data of the optical lens assembly of the third embodiment of the invention.

FIG. 17 shows aspheric surface parameters of the optical lens assembly of the third embodiment of the invention.

FIG. 20 shows detailed optical data of the optical lens assembly of the fourth embodiment of the invention.

FIG. 21 shows aspheric surface parameters of the optical lens assembly of the fourth embodiment of the invention.

FIG. 24 shows detailed optical data of the optical lens assembly of the fifth embodiment of the invention.

FIG. 25 shows aspheric surface parameters of the optical lens assembly of the fifth embodiment of the invention.

FIG. 28 shows detailed optical data of the optical lens assembly of the sixth embodiment of the invention.

FIG. 29 shows aspheric surface parameters of the optical lens assembly of the sixth embodiment of the invention.

FIG. 32 shows detailed optical data of the optical lens assembly of the seventh embodiment of the invention.

FIG. 33 shows aspheric surface parameters of the optical lens assembly of the seventh embodiment of the invention.

FIG. 36 shows detailed optical data of the optical lens assembly of the eighth embodiment of the invention.

FIG. 37 shows aspheric surface parameters of the optical lens assembly of the eighth embodiment of the invention.

FIG. 38 is a schematic of an optical lens assembly of the ninth embodiment of the invention.

FIG. 39A to FIG. 39D are diagrams of the longitudinal spherical aberration and various aberrations of the optical lens assembly of the ninth embodiment.

FIG. 40 shows detailed optical data of the optical lens assembly of the ninth embodiment of the invention.

FIG. 41 shows aspheric surface parameters of the optical lens assembly of the ninth embodiment of the invention.

FIG. 42 and FIG. 43 show the numeric values of various important parameters and relationship formulas thereof of the optical lens assembly elements of the first to ninth embodiments of the invention.

DESCRIPTION OF THE EMBODIMENTS

In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

Figure 1:
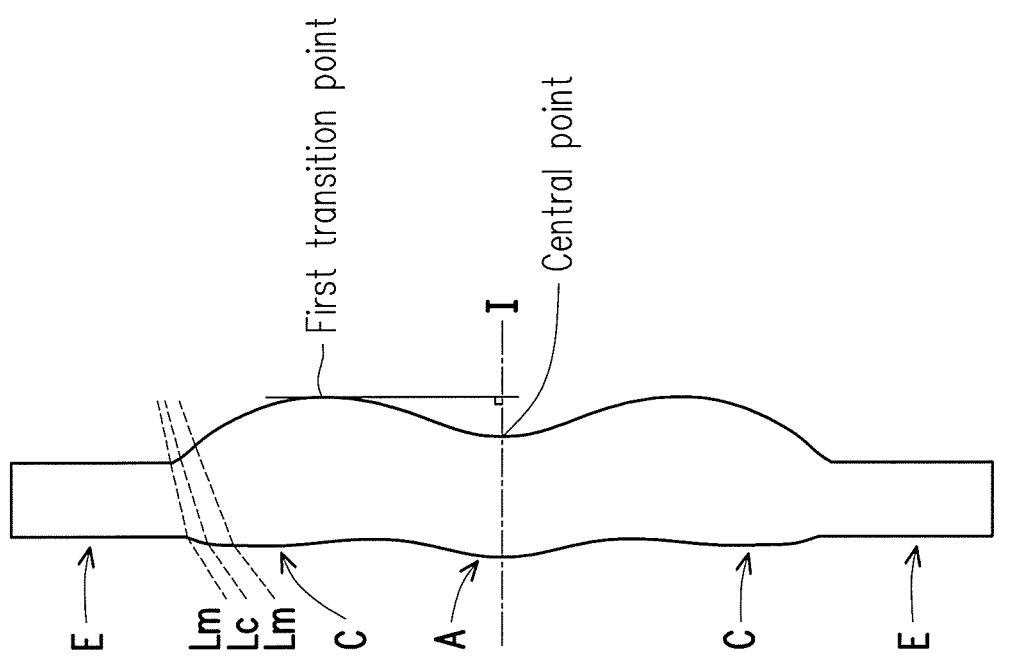
FIG. 1 is a schematic describing the surface structure of a lens element.

1. FIG. 1 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

Figure 2:
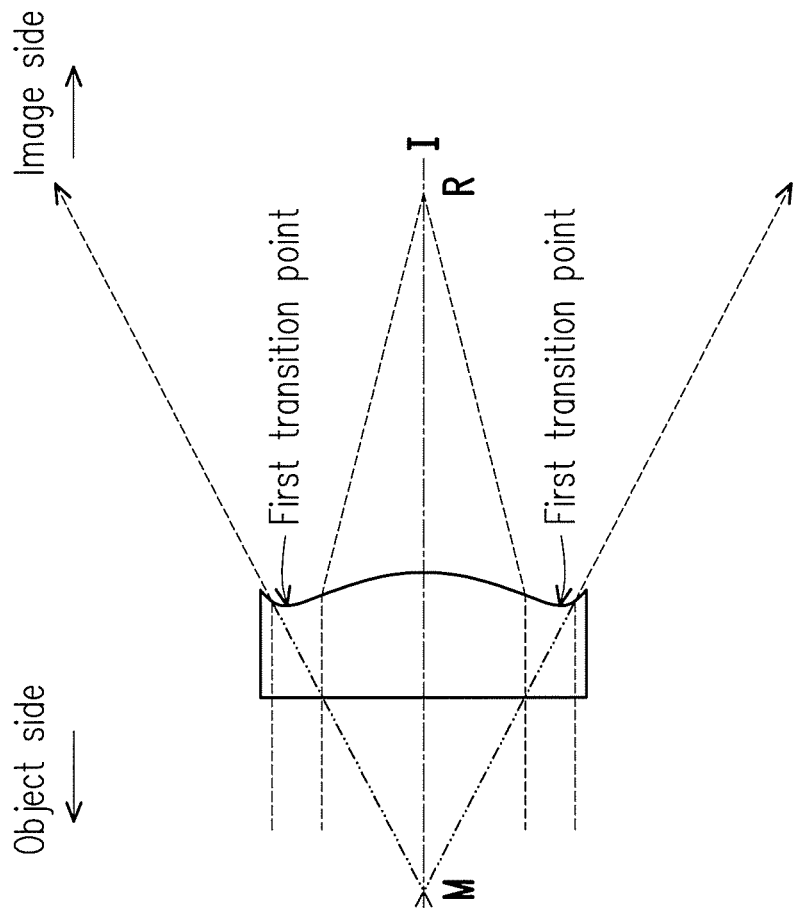
FIG. 2 is a schematic describing the surface concave and convex structure and the ray focus of a lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens element surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second transition point (portion II).

Referring to a third example depicted in FIG. 5, no transition point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

Figure 6:
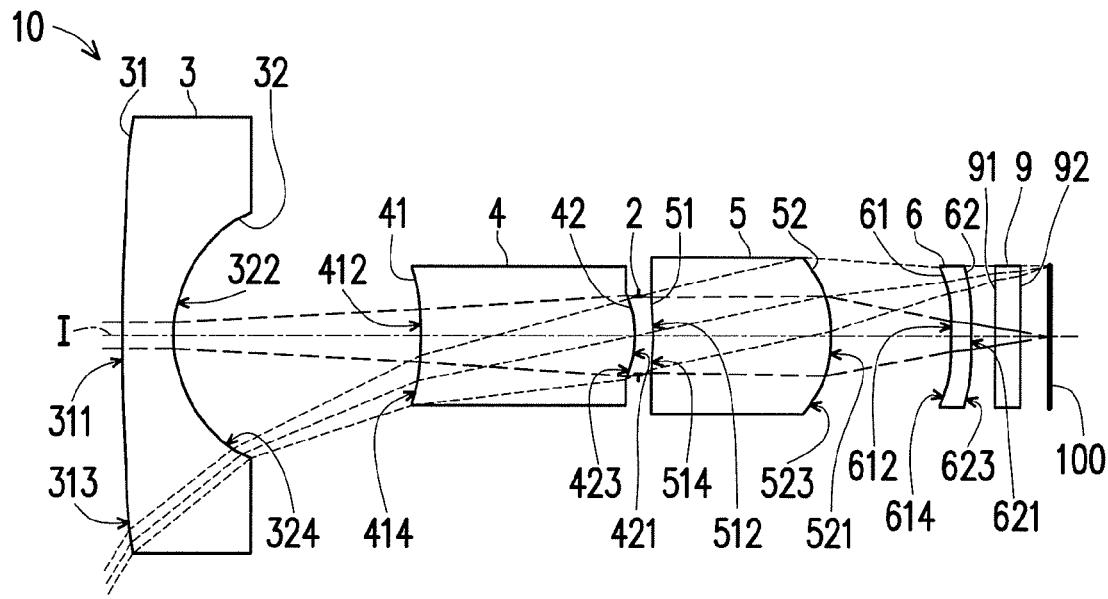
FIG. 6 is a schematic of an optical lens assembly of the first embodiment of the invention.

FIG. 6 is a schematic of an optical lens assembly of the first embodiment of the invention, and FIG. 7A to FIG. 7D are diagrams of the longitudinal spherical aberration and various aberrations of the optical lens assembly of the first embodiment. Referring first to FIG. 6, the optical lens assembly 10 of the first embodiment of the invention includes a first lens element 3, a second lens element 4, an aperture stop 2, a third lens element 5, a fourth lens element 6 and a cover glass 9 from the object side to the image side in order along an optical axis I of optical the imaging lens 10. When rays emitted by an object to be photographed enter the optical lens assembly 10 and pass through the first lens element 3, the second lens element 4, the aperture stop 2, the third lens element 5, the fourth lens element 6, and the cover glass 9, an image is formed on an image plane 100. The cover glass 9 is, for instance, a glass plate used to protect an image sensor at the image plane 100. It should be added that, the object side is a side facing the object to be photographed and the image side is a side facing the image plane 100.

The first lens element 3, the second lens element 4, the third lens element 5, the fourth lens 6, and the cover glass 9 all each have an object-side surface 31, 41, 51, 61, 91 facing the object side and allowing the imaging rays to pass through and an image-side surface 32, 42, 52, 62, 92 facing the image side and allowing the imaging rays to pass through.

One of the second lens element 4 and the third lens element 5 is made of glass having an Abbe number greater than 60. In this embodiment, the second lens element 4 is made of glass having an Abbe number greater than 60. Moreover, to meet the demand for a light product, the first lens element 3 to the fourth lens element 6 all have refracting power, and the first lens element 3, the third lens element 5, and the fourth lens element 6 are all made of a plastic material, but the materials of the first lens element 3 to the fourth lens element 6 are not limited thereto.

The first lens element 3 has negative refracting power. The object-side surface 31 of the first lens element 3 is a convex surface and has a convex portion 311 in a vicinity of the optical axis I and a convex portion 313 in a vicinity of a periphery of the first lens element 3. The image-side surface 32 of the first lens element 3 is a concave surface and has a concave portion 322 in a vicinity of the optical axis I and a concave portion 324 in a vicinity of the periphery of the first lens element 3.

The second lens element 4 has positive refracting power. The object-side surface 41 of the second lens element 4 is a concave surface and has a concave portion 412 in a vicinity of the optical axis I and a concave portion 414 in a vicinity of a periphery of the second lens element 4. The image-side surface 42 of the second lens element 4 is a convex surface and has a convex portion 421 in a vicinity of the optical axis I and a convex portion 423 in a vicinity of a periphery of the second lens element 4. In the present embodiment, the object-side surface 41 and the image-side surface 42 of the second lens element 4 are both spherical surfaces.

The third lens element 5 has refracting power, e.g. positive refracting power. The object-side surface 51 of the third lens element 5 is a concave surface and has a concave portion 512 in a vicinity of the optical axis I and a concave portion 514 in a vicinity of a periphery of the third lens element 5. The image-side surface 52 of the third lens element 5 is a convex surface and has a convex portion 521 in a vicinity of the optical axis I and a convex portion 523 in a vicinity of the periphery of the third lens element 5.

The fourth lens element 6 has negative refracting power. The object-side surface 61 of the fourth lens element 6 is a concave surface and has a concave portion 612 in a vicinity of the optical axis I and a concave portion 614 in a vicinity of a periphery of the fourth lens element 6. The image-side surface 62 is a convex surface and has a convex portion 621 in a vicinity of the optical axis I and a convex portion 623 in a vicinity of the periphery of the fourth lens element 6.

In addition, only the aforementioned lens elements have refracting power, and the quantity of the lens elements having refracting power of the optical lens assembly 10 is only four.

The other detailed optical data of the first embodiment is as shown in FIG. 8, and in the first embodiment, the effective focal length (EFL) of the whole optical lens assembly 10 is 0.850 mm, the half field of view (HFOV) thereof is 60.000°, the f-number (Fno) thereof is 2.686, the system length thereof is 11.124 mm, and the image height thereof is 0.843 mm. In particular, the system length refers to the distance from the object-side surface 31 of the first lens element 3 to the image plane 100 on the optical axis I.

Moreover, in the present embodiment, the six surfaces of the object-side surfaces 31, 51, and 61 and the image-side surfaces 32, 52, and 62 of the first lens element 3, the third lens element 5, and the fourth lens element 6 are all aspheric surfaces, and the aspheric surfaces are defined according to the following general formula:

$$Z(Y) = \frac{Y^2}{R} \Big/ \left(1 + \sqrt{1 - (1+K)\frac{Y^2}{R^2}}\right) + \sum_{i=1}^{n} a_i \times Y^i \quad (1)$$

wherein:
Y: distance between a point on the aspheric surface curve and the optical axis I;
Z: depth (perpendicular distance between the point on the aspheric surface that is spaced by the distance Y from the optical axis I and a tangent plane tangent to the vertex of the aspheric surface on the optical axis I) of the aspheric surface;
R: radius of curvature of the lens element surface in a vicinity of the optical axis I;
K: conic constant;
$a_i$: i-th aspheric surface coefficient.

Each of the aspheric coefficients of the object-side surfaces 31, 51, and 61 and the image-side surfaces 32, 52, and 62 in general formula (1) is as shown in FIG. 9. In particular, column number 31 in FIG. 9 represents the aspheric coefficient of the object-side surface 31 of the first lens element 3, and the other column fields are defined in a similar manner.

Moreover, the relationship between each of the important parameters in the optical lens assembly 10 of the first embodiment is as shown in FIG. 42.
wherein,
T1 is the thickness of the first lens element 3 on the optical axis I;
T2 is the thickness of the second lens element 4 on the optical axis I;
T3 is the thickness of the third lens element 5 on the optical axis I;
T4 is the thickness of the fourth lens element 6 on the optical axis I;
TC is the thickness of the cover glass 9 on the optical axis I;
G12 is the distance from the image-side surface 32 of the first lens element 3 to the object-side surface 41 of the second lens element 4 on the optical axis I, i.e. an air gap from the first lens element 3 to the second lens element 4 on the optical axis I;

G23 is the distance from the image-side surface 42 of the second lens element 4 to the object-side surface 51 of the third lens element 5 on the optical axis I, i.e. an air gap from the second lens element 4 to the third lens element 5 on the optical axis I;

G34 is the distance from the image-side surface 52 of the third lens element 5 to the object-side surface 61 of the fourth lens element 6 on the optical axis I, i.e. an air gap from the third lens element 5 to the fourth lens element 6 on the optical axis I;

G4C is the distance from the image-side surface 62 of the fourth lens element 6 to the object-side surface 91 of the cover glass 9 on the optical axis I, i.e. an air gap from the fourth lens element 6 to the cover glass 9 on the optical axis I;

GCP is the distance from the image-side surface 92 of the cover glass 9 to the image plane 100 on the optical axis I, i.e. an air gap from the cover glass 9 to the image plane 100 on the optical axis I;

AGG is the sum of three air gaps from the first lens element 3 to the fourth lens element 6 on the optical axis I, i.e., the sum of G12, G23, and G34;

ALT is the sum of the thicknesses of the first lens element 3, the second lens element 4, the third lens element 5, and the fourth lens element 6 on the optical axis I, i.e., the sum of T1, T2, T3, and T4;

TTL is the distance from the object-side surface 31 of the first lens element 3 to the image plane 100 on the optical axis I;

TL is the distance from the object-side surface 31 of the first lens element 3 to the image-side surface 62 of the fourth lens element 6 on the optical axis I;

BFL is the distance from the image-side surface 62 of the fourth lens element 6 to the image plane 100 on the optical axis I;

EFL is the effective focal length of the optical lens assembly 10; and

TA is the distance from the aperture stop 2 to the object-side surface (such as the object-side surface 51 of the third lens element 5 in the present embodiment) of the next adjacent lens element on the optical axis I.

Moreover, the following are further defined:

f1 is the focal length of the first lens element 3;
f2 is the focal length of the second lens element 4;
f3 is the focal length of the third lens element 5;
f4 is the focal length of the fourth lens element 6;
n1 is the index of refraction of the first lens element 3;
n2 is the index of refraction of the second lens element 4;
n3 is the index of refraction of the third lens element 5;
n4 is the index of refraction of the fourth lens element 6;
v1 is the Abbe number of the first lens element 3, and the Abbe number can also be referred to as the coefficient of dispersion;
v2 is the Abbe number of the second lens element 4;
v3 is the Abbe number of the third lens element 5; and
v4 is the Abbe number of the fourth lens element 6.

Figures 7A, 7B, 7C, 7D:
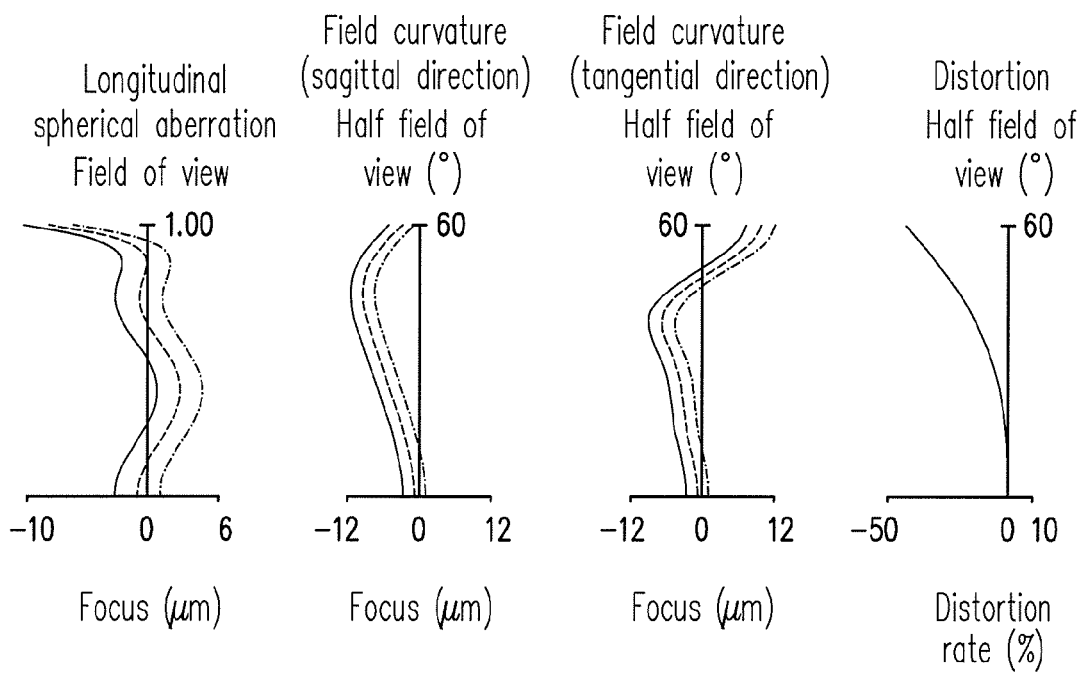
FIG. 7A to FIG. 7D are diagrams of the longitudinal spherical aberration and various aberrations of the optical lens assembly of the first embodiment.

Referring further to FIG. 7A to FIG. 7D, FIG. 7A describes longitudinal spherical aberration of the first embodiment when the pupil radius thereof is 0.1545 mm, FIG. 7B and FIG. 7C respectively describe the field curvature in the sagittal direction and the field curvature in the tangential direction on the image plane 100 of the first embodiment when the wavelengths thereof are 830 nm, 850 nm, and 870 nm. FIG. 7D describes the distortion aberration on the image plane 100 of the first embodiment when the wavelengths thereof are 830 nm, 850 nm, and 870 nm. In the longitudinal spherical aberration figure of FIG. 7A of the first embodiment, the curves formed by various wavelengths are all very close and are in a vicinity of the center, indicating the off-axis rays at different heights of each wavelength are all concentrated in a vicinity of the imaging point, and it can be seen from the deflection amplitude of the curve of each wavelength that, the imaging point deviation of the off-axis rays at different heights is controlled within the range of ±11 microns, and therefore in the present embodiment, the spherical aberration of the same wavelength is indeed significantly improved. Moreover, the distances between the three representative wavelengths are also relative close, indicating the imaging positions of different wavelength rays are relatively concentrated, and therefore the chromatic aberration is also significantly improved.

In the two field curvature figures of FIG. 7B and FIG. 7C, the focal length variation amount of three representative wavelengths in the entire field of view is within ±13 microns, indicating that the optical system of the first embodiment can effectively eliminate aberrations. The distortion aberration figure of FIG. 7D shows the distortion aberration of the first embodiment is maintained within the range of ±45%, indicating the distortion aberration of the first embodiment satisfies the imaging quality requirements of the optical system, and as a result, in comparison to the current optical lens, in the first embodiment, under the condition that the system length is reduced to about 11.124 mm, good imaging quality can still be provided. Therefore, in the first embodiment, under the condition of maintaining good optical performance, the lens length can be reduced and the shooting angle can be expanded to achieve a product design that is thinner and has increased field of view.

According to thermal stability analysis of the optical lens assembly 10, when the first to fourth lens elements 3, 4, 5, and 6 are all made of plastic material, the deviation value of the through-focus modulation transfer function (MTF) of the optical lens assembly 10 at 0° C. is −0.012 mm, and the deviation value of the through-focus MTF thereof at 50° C. is 0.022 mm. If the second lens element 4 is changed to be made of glass having an Abbe number greater than 60 and the other lens elements are maintained to be made of plastic material, the deviation value of the through-focus MTF thereof at 0° C. is reduced to −0.005 mm, and the deviation value of the through-focus MTF thereof at 50° C. is reduced to 0.011 mm. If the third lens element 5 is changed to be made of glass having an Abbe number greater than 60 and the other lens elements are maintained to be made of plastic material, the deviation value of the through-focus MTF thereof at 0° C. is reduced to 0.002 mm, and the deviation value of the through-focus MTF thereof at 50° C. is reduced to −0.001 mm. If the first lens element 3 and the second lens element 4 are changed to be made of glass having an Abbe number greater than 60 and the other lens elements are maintained to be made of plastic material, the deviation value of the through-focus MTF thereof at 0° C. is reduced to 0 mm, and the deviation value of the through-focus MTF thereof at 50° C. is reduced to 0 mm.

In this embodiment, the second lens element 4 is made of glass having an Abbe number greater than 60, so that the optical lens assembly 10 in this embodiment has better thermal stability compared with an optical lens assembly with all the lens elements made of plastic material.

FIG. 10 is a schematic of an optical lens assembly of the second embodiment of the invention, and FIG. 11A to FIG. 11D are diagrams of the longitudinal spherical aberration and various aberrations of the optical lens assembly of the second embodiment. Referring first to FIG. 10, the second embodiment of the optical lens assembly 10 of the invention is similar to the first embodiment, and the difference therebetween is as follows. The optical data, the aspheric coefficients, and the parameters of the lens elements 3, 4, 5, and 6 are somewhat different. Moreover, in this embodiment, the third lens element 5 is made of glass having an Abbe number greater than 60, and the first lens element 3, the second lens element 4, and the fourth lens element 6 are made of plastic material. Besides, the object-side surface 51 of the third lens element 3 is a convex surface and has a convex portion 511 in a vicinity of the optical axis I and a convex portion 513 in a vicinity of a periphery of the third lens element 3. It should be mentioned here that, to clearly show the figure, in FIG. 10, a portion of the reference numerals of the same concave portion and convex portion as the first embodiment is omitted. In addition, in this embodiment, the object-side surfaces 31 and 51 and the image-side surface 52 are spherical surfaces, and the object-side surfaces 41 and 61 and the image-side surfaces 32, 42, and 62 are aspheric surfaces.

The detailed optical data of the optical lens assembly 10 is as shown in FIG. 12, and in the second embodiment, the effective focal length of the whole optical lens assembly 10 is 2.474 mm, the HFOV thereof is 73.030°, the Fno thereof is 2.839, the system length thereof is 6.586 mm, and the image height thereof is 2.579 mm.

FIG. 13 shows each of the aspheric coefficients of the object-side surfaces 31, 41, and 61 and the image-side surfaces 32, 42, and 62 of the second embodiment in general formula (1).

Moreover, the relationship between each of the important parameters in the optical lens assembly 10 of the second embodiment is as shown in FIG. 42.

In the longitudinal spherical aberration figure of FIG. 11A of the second embodiment in the condition that the pupil radius thereof is 0.4498 mm, the imaging point deviation of off-axis rays at different heights is controlled to be within the range of ±10 microns. In the two field curvature figures of FIG. 11B and FIG. 11C, the focal length variation amount of three representative wavelengths in the entire field of view is within ±25 microns. The distortion aberration figure of FIG. 11D shows that the distortion aberration of the second embodiment is maintained within the range of ±70%. Accordingly, in comparison to the first embodiment, in the second embodiment, good imaging quality can still be provided under the condition of the system length reduced to about 6.586 mm.

It can be known from the above that, the advantages of the second embodiment in comparison to the first embodiment are: the system length of the second embodiment is less than the system length of the first embodiment, the HFOV of the second embodiment is larger than that of the first embodiment, the longitudinal spherical aberration of the second embodiment is less than that of the first embodiment, the thermal stability of the second embodiment is better than that of the first embodiment, and the second embodiment is easier to manufacture than the first embodiment, and therefore the yield is higher.

FIG. 14 is a schematic of an optical lens assembly of the third embodiment of the invention, and FIG. 15A to FIG. 15D are diagrams of the longitudinal spherical aberration and various aberrations of the optical lens assembly of the third embodiment. Referring first to FIG. 14, the third embodiment of the optical lens assembly 10 of the invention is similar to the first embodiment, and the difference therebetween is as follows. The optical data, the aspheric coefficients, and the parameters of the lens elements 3, 4, 5, and 6 are somewhat different. Moreover, in this embodiment, the third lens element 5 is made of glass having an Abbe number greater than 60, and the first lens element 3, the second lens element 4, and the fourth lens element 6 are made of plastic material. Besides, the object-side surface 51 of the third lens element 3 is a convex surface and has a convex portion 511 in a vicinity of the optical axis I and a convex portion 513 in a vicinity of a periphery of the third lens element 3. It should be mentioned here that, to clearly show the figure, in FIG. 14, a portion of reference numerals of the same concave portion and convex portion as the first embodiment is omitted. In addition, in this embodiment, the object-side surfaces 31 and 51 and the image-side surface 52 are spherical surfaces, and the object-side surfaces 41 and 61 and the image-side surfaces 32, 42, and 62 are aspheric surfaces.

The detailed optical data of the optical lens assembly 10 is as shown in FIG. 16, and in the third embodiment, the effective focal length of the whole optical lens assembly 10 is 0.997 mm, the HFOV thereof is 43.006°, the Fno thereof is 2.800, the system length thereof is 6.300 mm, and the image height thereof is 0.791 mm.

FIG. 17 shows each of the aspheric coefficients of the object-side surfaces 31, 41, and 61 and the image-side surfaces 32, 42, and 62 of the third embodiment in general formula (1).

Moreover, the relationship between each of the important parameters in the optical lens assembly 10 of the third embodiment is as shown in FIG. 42.

In the longitudinal spherical aberration figure of FIG. 15A of the third embodiment in the condition that the pupil radius thereof is 0.1786 mm, the imaging point deviation of off-axis rays at different heights is controlled to be within the range of ±13.6 microns. In the two field curvature figures of FIG. 15B and FIG. 15C, the focal length variation amount of three representative wavelengths in the entire field of view is within ±7 microns. The distortion aberration figure of FIG. 15D shows that the distortion aberration of the third embodiment is maintained within the range of ±16%. Accordingly, in comparison to the current optical lens, in the third embodiment, good imaging quality can still be provided under the condition of the system length reduced to about 6.300 mm.

It can be known from the above that, advantages of the third embodiment in comparison to the first embodiment are: the system length of the optical lens assembly 10 of the third embodiment is shorter than that of the first embodiment, the longitudinal spherical aberration of the third embodiment is less than that of the first embodiment, the field curvature of the third embodiment is less than that of the first embodiment, the distortion of the third embodiment is less than that of the first embodiment, the thermal stability of the third embodiment is better than that of the first embodiment, and the third embodiment is easier to manufacture than the first embodiment, and therefore the yield is higher.

Figure 18:
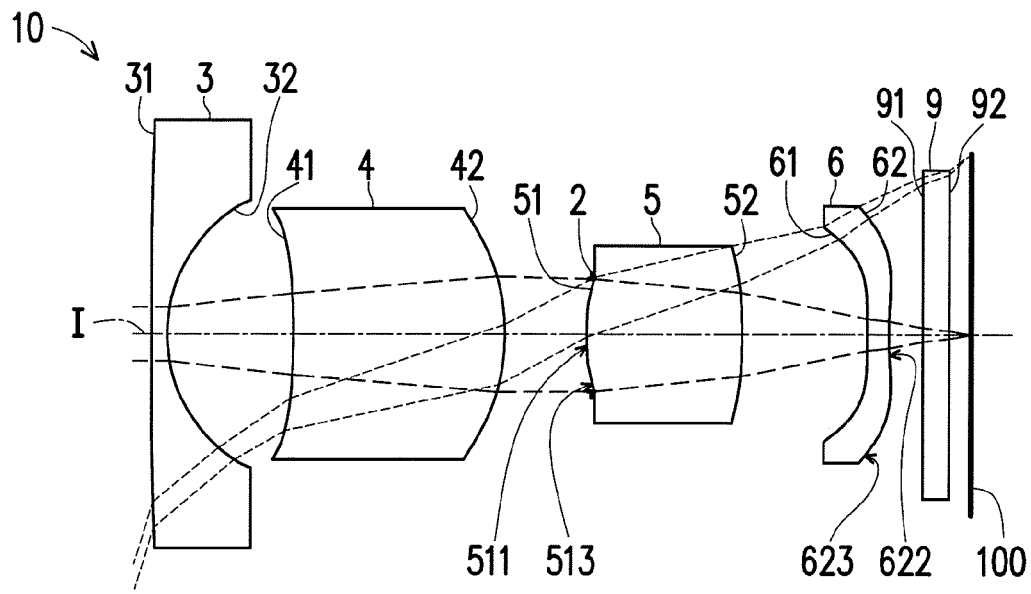
FIG. 18 is a schematic of an optical lens assembly of the fourth embodiment of the invention.

FIG. 18 is a schematic of an optical lens assembly of the fourth embodiment of the invention, and FIG. 19A to FIG. 19D are diagrams of the longitudinal spherical aberration and various aberrations of the optical lens assembly of the fourth embodiment. Referring first to FIG. 18, the fourth embodiment of the optical lens assembly 10 of the invention is similar to the first embodiment, and the difference therebetween is as follows. The optical data, the aspheric coefficients, and the parameters of the lens elements 3, 4, 5, and 6 are somewhat different. Moreover, in this embodiment, the third lens element 5 is made of glass having an Abbe number greater than 60, and the first lens element 3, the second lens element 4, and the fourth lens element 6 are made of plastic material. Besides, the object-side surface 51 of the third lens element 3 is a convex surface and has a convex portion 511 in a vicinity of the optical axis I and a convex portion 513 in a vicinity of a periphery of the third lens element 3. In addition, in this embodiment, the image-side surface 62 of the fourth lens element 6 has a concave portion 622 in a vicinity of the optical axis I and a convex portion 623 in a vicinity of a periphery of the fourth lens element 6. It should be mentioned here that, to clearly show the figure, in FIG. 18, a portion of reference numerals of the same concave portion and convex portion as the first embodiment is omitted. In addition, in this embodiment, the object-side surfaces 31 and 51 and the image-side surface 52 are spherical surfaces, and the object-side surfaces 41 and 61 and the image-side surfaces 32, 42, and 62 are aspheric surfaces.

The detailed optical data of the optical lens assembly 10 is as shown in FIG. 20, and in the fourth embodiment, the effective focal length of the whole optical lens assembly 10 is 1.825 mm, the HFOV thereof is 73.000°, the Fno thereof is 2.842, the system length thereof is 9.644 mm, and the image height thereof is 2.041 mm.

FIG. 21 shows each of the aspheric coefficients of the object-side surfaces 31, 41, and 61 and the image-side surfaces 32, 42, and 62 of the fourth embodiment in general formula (1).

Moreover, the relationship between each of the important parameters in the optical lens assembly 10 of the fourth embodiment is as shown in FIG. 42.

Figures 19A, 19B, 19C, 19D:
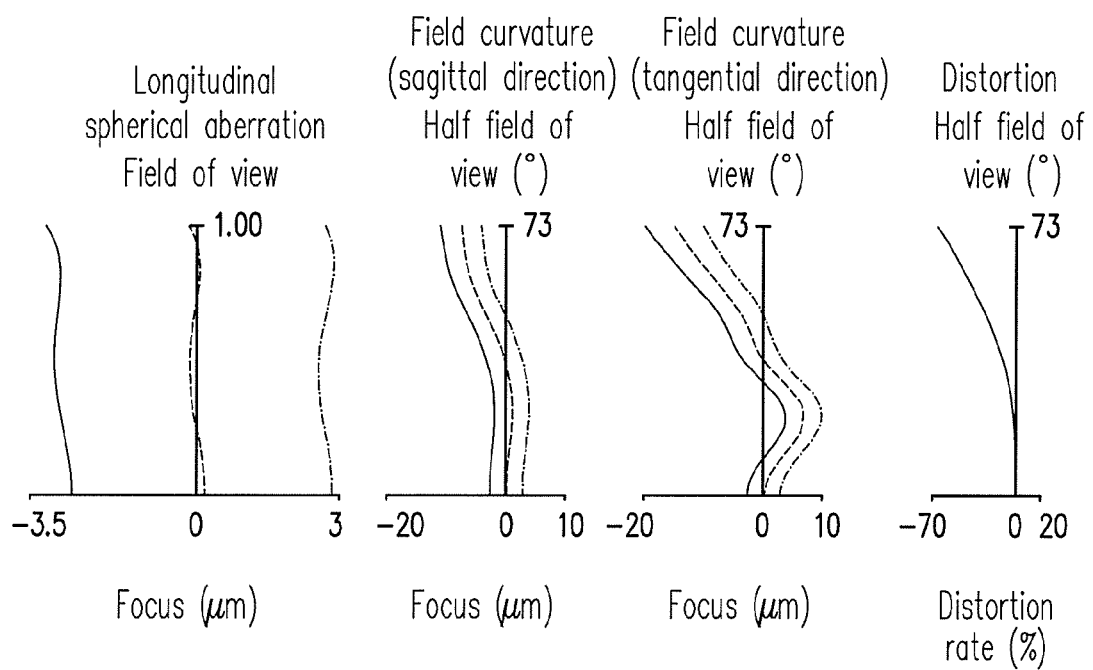
FIG. 19A to FIG. 19D are diagrams of the longitudinal spherical aberration and various aberrations of the optical lens assembly of the fourth embodiment.

In the longitudinal spherical aberration figure of FIG. 19A of the fourth embodiment in the condition that the pupil radius thereof is 0.3258 mm, the imaging point deviation of off-axis rays at different heights is controlled to be within the range of ±3.3 microns. In the two field curvature figures of FIG. 19B and FIG. 19C, the focal length variation amount of three representative wavelengths in the entire field of view is within ±20 microns. The distortion aberration figure of FIG. 19D shows that the distortion aberration of the fourth embodiment is maintained within the range of ±70%. Accordingly, in comparison to the current optical lens, in the fourth embodiment, good imaging quality can still be provided under the condition of the system length reduced to about 9.644 mm.

It can be known from the above that, the advantages of the fourth embodiment in comparison to the first embodiment are: the system length of the optical lens assembly 10 of the fourth embodiment is less than that of the first embodiment, the HFOV of the fourth embodiment is larger than that of the first embodiment, the longitudinal spherical aberration of the fourth embodiment is less than that of the first embodiment, and the thermal stability of the fourth embodiment is better than that of the first embodiment.

Figure 22:
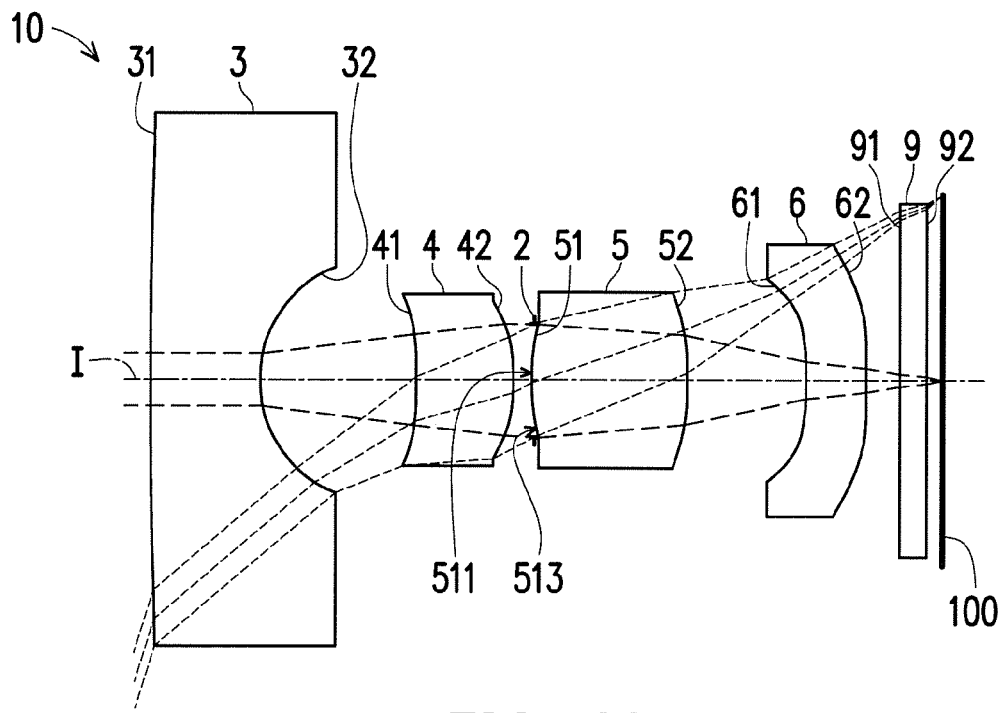
FIG. 22 is a schematic of an optical lens assembly of the fifth embodiment of the invention.

FIG. 22 is a schematic of an optical lens assembly of the fifth embodiment of the invention, and FIG. 23A to FIG. 23D are diagrams of the longitudinal spherical aberration and various aberrations of the optical lens assembly of the fifth embodiment. Referring first to FIG. 22, the fifth embodiment of the optical lens assembly 10 of the invention is similar to the first embodiment, and the difference therebetween is as follows. The optical data, the aspheric coefficients, and the parameters of the lens elements 3, 4, 5, and 6 are somewhat different. Moreover, in this embodiment, the third lens element 5 is made of glass having an Abbe number greater than 60, and the first lens element 3, the second lens element 4, and the fourth lens element 6 are made of plastic material. Besides, the object-side surface 51 of the third lens element 3 is a convex surface and has a convex portion 511 in a vicinity of the optical axis I and a convex portion 513 in a vicinity of a periphery of the third lens element 3. It should be mentioned here that, to clearly show the figure, in FIG. 22, a portion of reference numerals of the same concave portion and convex portion as the first embodiment is omitted. In addition, in this embodiment, the object-side surfaces 31 and 51 and the image-side surface 52 are spherical surfaces, and the object-side surfaces 41 and 61 and the image-side surfaces 32, 42, and 62 are aspheric surfaces.

The detailed optical data of the optical lens assembly 10 is as shown in FIG. 24, and in the fifth embodiment, the effective focal length of the whole optical lens assembly 10 is 1.774 mm, the HFOV thereof is 73.031°, the Fno thereof is 2.845, the system length thereof is 9.263 mm, and the image height thereof is 2.156 mm.

FIG. 25 shows each of the aspheric coefficients of the object-side surfaces 31, 41, and 61 and the image-side surfaces 32, 42, and 62 of the fifth embodiment in general formula (1).

Moreover, the relationship between each of the important parameters in the optical lens assembly 10 of the fifth embodiment is as shown in FIG. 42.

Figures 23A, 23B, 23C, 23D:
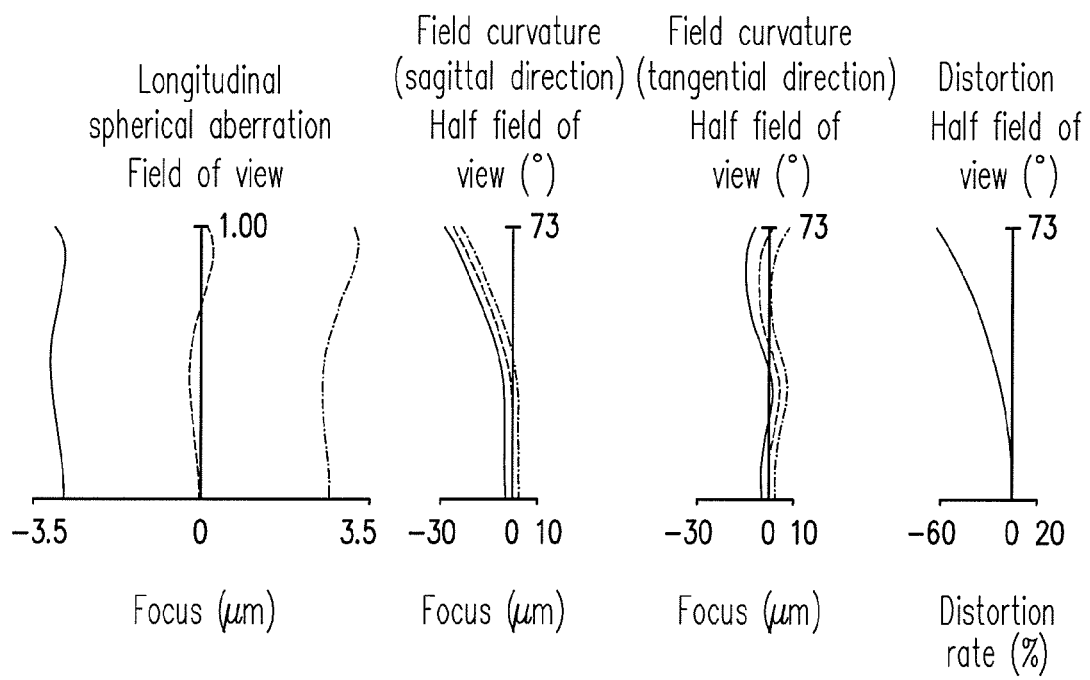
FIG. 23A to FIG. 23D are diagrams of the longitudinal spherical aberration and various aberrations of the optical lens assembly of the fifth embodiment.

In the longitudinal spherical aberration figure of FIG. 23A of the fifth embodiment in the condition that the pupil radius thereof is 0.3167 mm, the imaging point deviation of off-axis rays at different heights is controlled to be within the range of ±3.3 microns. In the two field curvature figures of FIG. 23B and FIG. 23C, the focal length variation amount of three representative wavelengths in the entire field of view is within ±30 microns. The distortion aberration figure of FIG. 23D shows that the distortion aberration of the fifth embodiment is maintained within the range of ±70%. Accordingly, in comparison to the current optical lens, in the fifth embodiment, good imaging quality can still be provided under the condition of the system length reduced to about 9.263 mm.

It can be known from the above that, advantages of the fifth embodiment in comparison to the first embodiment are: the system length of the optical lens assembly 10 of the fifth embodiment is shorter than that of the first embodiment, the longitudinal spherical aberration of the fifth embodiment is less than that of the first embodiment, the thermal stability of the fifth embodiment is better than that of the first embodiment, and the fifth embodiment is easier to manufacture than the first embodiment, and therefore the yield is higher.

Figure 26:
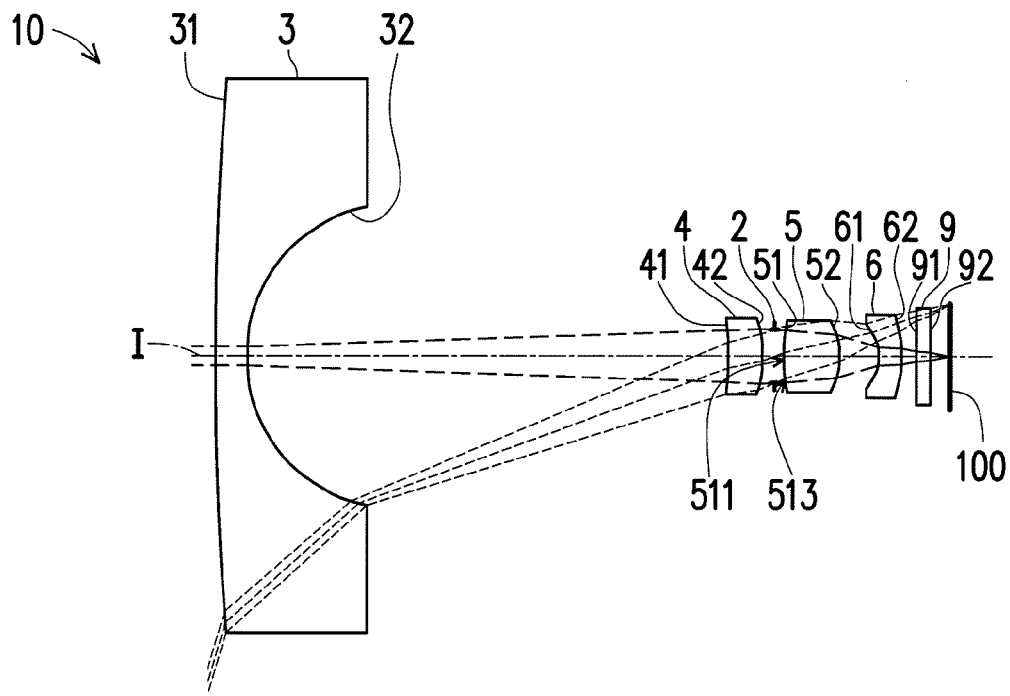
FIG. 26 is a schematic of an optical lens assembly of the sixth embodiment of the invention.

FIG. 26 is a schematic of an optical lens assembly of the sixth embodiment of the invention, and FIG. 27A to FIG. 27D are diagrams of the longitudinal spherical aberration and various aberrations of the optical lens assembly of the sixth embodiment. Referring first to FIG. 26, the sixth embodiment of the optical lens assembly 10 of the invention is similar to the first embodiment, and the difference therebetween is as follows. The optical data, the aspheric coefficients, and the parameters of the lens elements 3, 4, 5, and 6 are somewhat different. Moreover, in this embodiment, the third lens element 5 is made of glass having an Abbe number greater than 60, and the first lens element 3, the second lens element 4, and the fourth lens element 6 are made of plastic material. Besides, the object-side surface 51 of the third lens element 3 is a convex surface and has a convex portion 511 in a vicinity of the optical axis I and a convex portion 513 in a vicinity of a periphery of the third lens element 3. It should be mentioned here that, to clearly show the figure, in FIG. 26, a portion of reference numerals of the same concave portion and convex portion as the first embodiment is omitted. In addition, in this embodiment, the object-side surfaces 31 and 51 and the image-side surface 52 are spherical surfaces, and the object-side surfaces 41 and 61 and the image-side surfaces 32, 42, and 62 are aspheric surfaces.

The detailed optical data of the optical lens assembly 10 is as shown in FIG. 28, and in the sixth embodiment, the effective focal length of the whole optical lens assembly 10 is 1.062 mm, the HFOV thereof is 73.055°, the Fno thereof is 2.800, the system length thereof is 14.219 mm, and the image height thereof is 1.019 mm.

FIG. 29 shows each of the aspheric coefficients of the object-side surfaces 31, 41, and 61 and the image-side surfaces 32, 42, and 62 of the sixth embodiment in general formula (1).

Moreover, the relationship between each of the important parameters in the optical lens assembly 10 of the sixth embodiment is as shown in FIG. 43.

Figures 27A, 27B, 27C, 27D:
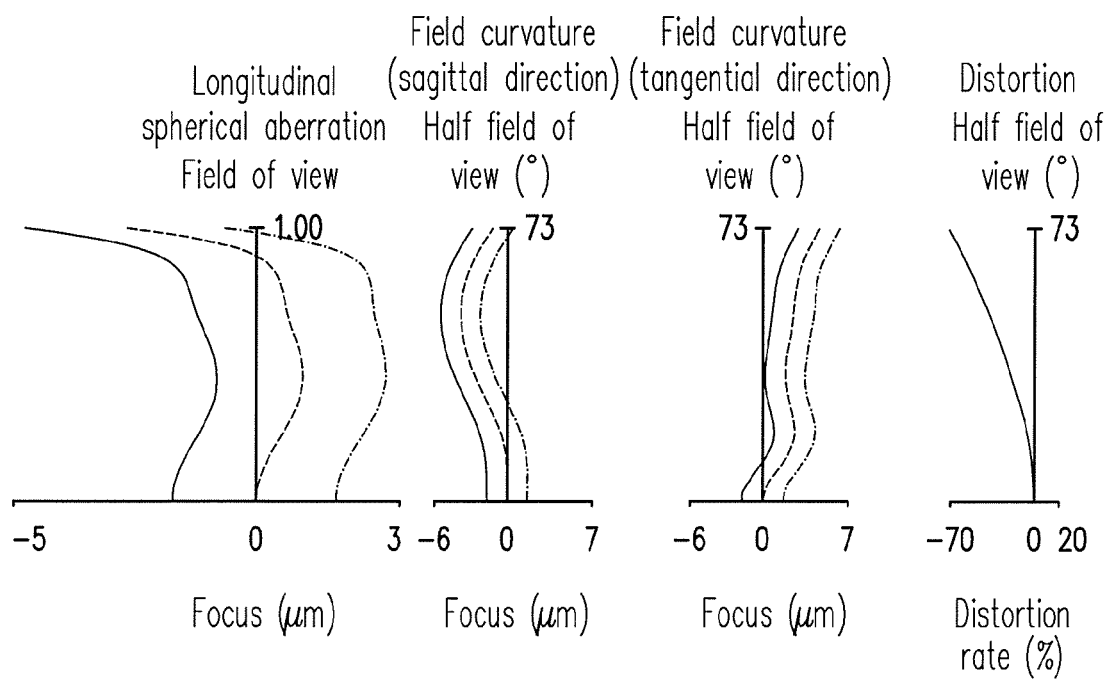
FIG. 27A to FIG. 27D are diagrams of the longitudinal spherical aberration and various aberrations of the optical lens assembly of the sixth embodiment.

In the longitudinal spherical aberration figure of FIG. 27A of the sixth embodiment in the condition that the pupil radius thereof is 0.1931 mm, the imaging point deviation of off-axis rays at different heights is controlled to be within the range of ±4.8 microns. In the two field curvature figures of FIG. 27B and FIG. 27C, the focal length variation amount of three representative wavelengths in the entire field of view is within ±7 microns. The distortion aberration figure of FIG. 27D shows that the distortion aberration of the sixth embodiment is maintained within the range of ±70%. Accordingly, in comparison to the current optical lens, in the sixth embodiment, good imaging quality can still be provided under the condition of the system length reduced to about 14.219 mm.

It can be known from the above that, advantages of the sixth embodiment in comparison to the first embodiment are: the longitudinal spherical aberration of the sixth embodiment is less than that of the first embodiment, the field curvature of the sixth embodiment is less than that of the first embodiment, and the thermal stability of the sixth embodiment is better than that of the first embodiment.

Figure 30:
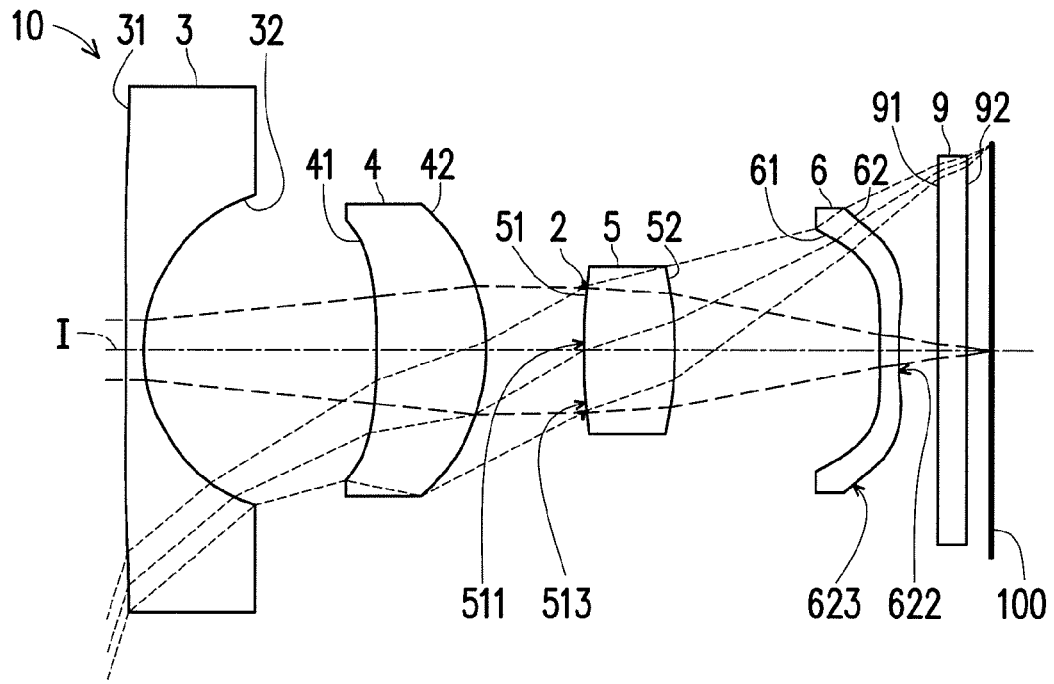
FIG. 30 is a schematic of an optical lens assembly of the seventh embodiment of the invention.

FIG. 30 is a schematic of an optical lens assembly of the seventh embodiment of the invention, and FIG. 31A to FIG. 31D are diagrams of the longitudinal spherical aberration and various aberrations of the optical lens assembly of the seventh embodiment. Referring first to FIG. 30, the seventh embodiment of the optical lens assembly 10 of the invention is similar to the first embodiment, and the difference therebetween is as follows. The optical data, the aspheric coefficients, and the parameters of the lens elements 3, 4, 5, and 6 are somewhat different. Moreover, in this embodiment, the third lens element 5 is made of glass having an Abbe number greater than 60, and the first lens element 3, the second lens element 4, and the fourth lens element 6 are made of plastic material. Besides, the object-side surface 51 of the third lens element 3 is a convex surface and has a convex portion 511 in a vicinity of the optical axis I and a convex portion 513 in a vicinity of a periphery of the third lens element 3. In addition, in this embodiment, the image-side surface 62 of the fourth lens element 6 has a concave portion 622 in a vicinity of the optical axis I and a convex portion 623 in a vicinity of a periphery of the fourth lens element 6. It should be mentioned here that, to clearly show the figure, in FIG. 30, a portion of reference numerals of the same concave portion and convex portion as the first embodiment is omitted. In addition, in this embodiment, the object-side surfaces 31 and 51 and the image-side surface 52 are spherical surfaces, and the object-side surfaces 41 and 61 and the image-side surfaces 32, 42, and 62 are aspheric surfaces.

The detailed optical data of the optical lens assembly 10 is as shown in FIG. 32, and in the seventh embodiment, the effective focal length of the whole optical lens assembly 10 is 1.830 mm, the HFOV thereof is 73.000°, the Fno thereof is 2.863, the system length thereof is 9.074 mm, and the image height thereof is 2.140 mm.

FIG. 33 shows each of the aspheric coefficients of the object-side surfaces 31, 41, and 61 and the image-side surfaces 32, 42, and 62 of the seventh embodiment in general formula (1).

Moreover, the relationship between each of the important parameters in the optical lens assembly 10 of the seventh embodiment is as shown in FIG. 43.

Figures 31A, 31B, 31C, 31D:
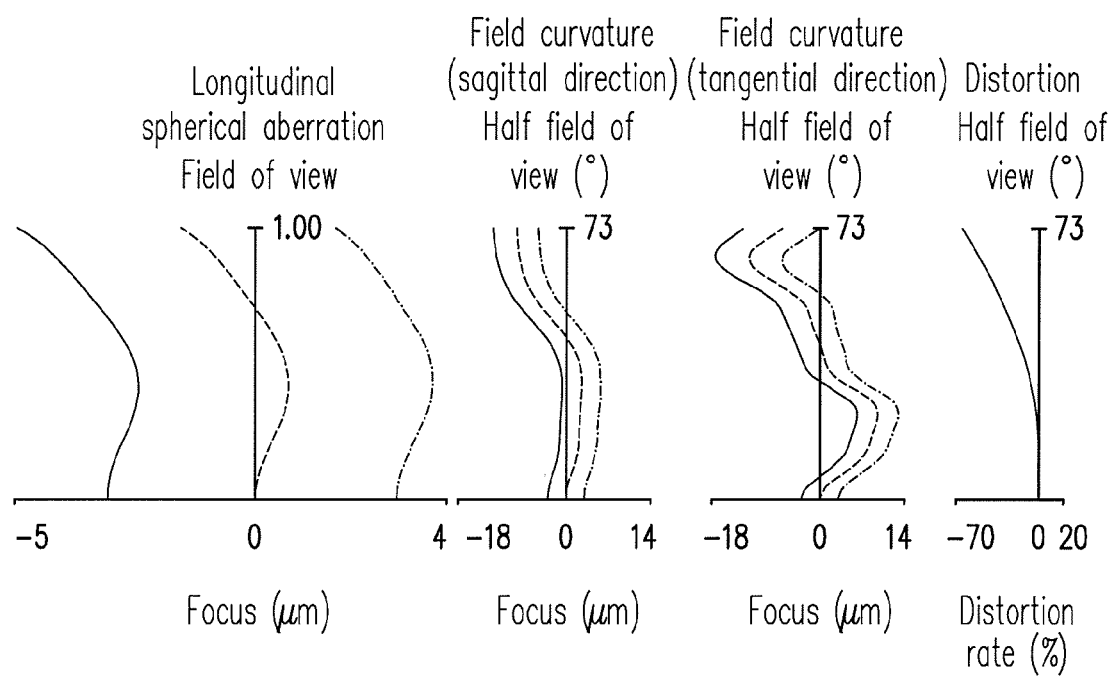
FIG. 31A to FIG. 31D are diagrams of the longitudinal spherical aberration and various aberrations of the optical lens assembly of the seventh embodiment.

In the longitudinal spherical aberration figure of FIG. 31A of the seventh embodiment in the condition that the pupil radius thereof is 0.3268 mm, the imaging point deviation of off-axis rays at different heights is controlled to be within the range of ±5 microns. In the two field curvature figures of FIG. 31B and FIG. 31C, the focal length variation amount of three representative wavelengths in the entire field of view is within ±18 microns. The distortion aberration figure of FIG. 31D shows that the distortion aberration of the seventh embodiment is maintained within the range of ±70%. Accordingly, in comparison to the current optical lens, in the seventh embodiment, good imaging quality can still be provided under the condition of the system length reduced to about 9.074 mm.

It can be known from the above that, the advantages of the seventh embodiment in comparison to the first embodiment are: the system length of the optical lens assembly 10 of the seventh embodiment is less than that of the first embodiment, the HFOV of the seventh embodiment is larger than that of the first embodiment, the longitudinal spherical aberration of the seventh embodiment is less than that of the first embodiment, and the thermal stability of the seventh embodiment is better than that of the first embodiment.

Figure 34:
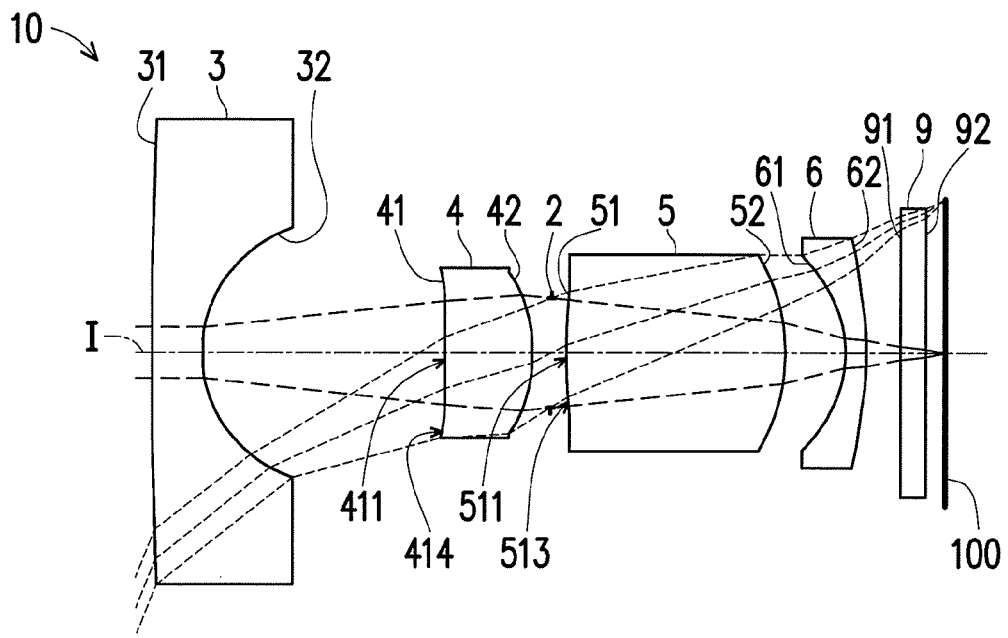
FIG. 34 is a schematic of an optical lens assembly of the eighth embodiment of the invention.

FIG. 34 is a schematic of an optical lens assembly of the eighth embodiment of the invention, and FIG. 35A to FIG. 35D are diagrams of the longitudinal spherical aberration and various aberrations of the optical lens assembly of the eighth embodiment. Referring first to FIG. 34, the eighth embodiment of the optical lens assembly 10 of the invention is similar to the first embodiment, and the difference therebetween is as follows. The optical data, the aspheric coefficients, and the parameters of the lens elements 3, 4, 5, and 6 are somewhat different. Moreover, in this embodiment, the third lens element 5 is made of glass having an Abbe number greater than 60, and the first lens element 3, the second lens element 4, and the fourth lens element 6 are made of plastic material. Besides, the object-side surface 41 of the second lens element 4 has a convex portion 411 in a vicinity of the optical axis I and a concave portion 414 in a vicinity of a periphery of the second lens element 4, and the object-side surface 51 of the third lens element 3 is a convex surface and has a convex portion 511 in a vicinity of the optical axis I and a convex portion 513 in a vicinity of a periphery of the third lens element 3. It should be mentioned here that, to clearly show the figure, in FIG. 34, a portion of reference numerals of the same concave portion and convex portion as the first embodiment is omitted. In addition, in this embodiment, the object-side surfaces 31 and 51 and the image-side surface 52 are spherical surfaces, and the object-side surfaces 41 and 61 and the image-side surfaces 32, 42, and 62 are aspheric surfaces.

The detailed optical data of the optical lens assembly 10 is as shown in FIG. 36, and in the eighth embodiment, the effective focal length of the whole optical lens assembly 10 is 1.701 mm, the HFOV thereof is 68.032°, the Fno thereof is 2.731, the system length thereof is 9.536 mm, and the image height thereof is 1.843 mm.

FIG. 37 shows each of the aspheric coefficients of the object-side surfaces 31, 41, and 61 and the image-side surfaces 32, 42, and 62 of the eighth embodiment in general formula (1).

Moreover, the relationship between each of the important parameters in the optical lens assembly 10 of the eighth embodiment is as shown in FIG. 43.

Figures 35A, 35B, 35C, 35D:
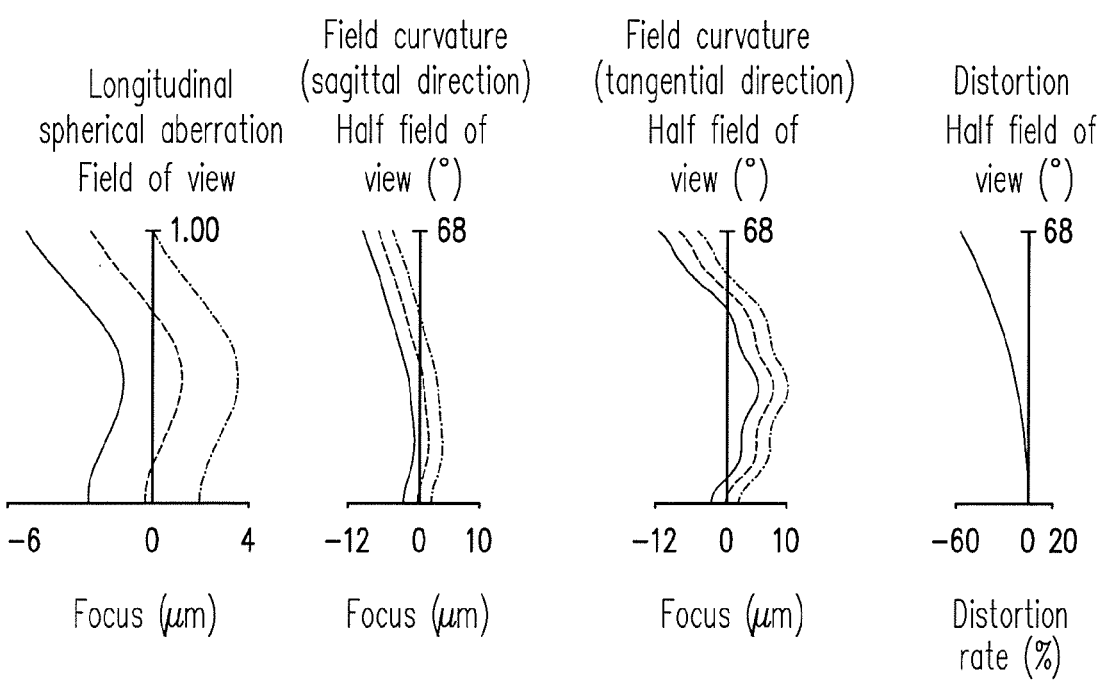
FIG. 35A to FIG. 35D are diagrams of the longitudinal spherical aberration and various aberrations of the optical lens assembly of the eighth embodiment.

In the longitudinal spherical aberration figure of FIG. 35A of the eighth embodiment in the condition that the pupil radius thereof is 0.3151 mm, the imaging point deviation of off-axis rays at different heights is controlled to be within the range of ±5.5 microns. In the two field curvature figures of FIG. 35B and FIG. 35C, the focal length variation amount of three representative wavelengths in the entire field of view is within ±12 microns. The distortion aberration figure of FIG. 35D shows that the distortion aberration of the eighth embodiment is maintained within the range of ±60%. Accordingly, in comparison to the current optical lens, in the eighth embodiment, good imaging quality can still be provided under the condition of the system length reduced to about 9.536 mm.

It can be known from the above that, advantages of the eighth embodiment in comparison to the first embodiment are: the system length of the optical lens assembly 10 of the eighth embodiment is shorter than that of the first embodiment, the HFOV of the eighth embodiment is larger than that of the first embodiment, the longitudinal spherical aberration of the eighth embodiment is less than that of the first embodiment, the field curvature of the eighth embodiment is less than that of the first embodiment, and the thermal stability of the eighth embodiment is better than that of the first embodiment.

FIG. 38 is a schematic of an optical lens assembly of the ninth embodiment of the invention, and FIG. 39A to FIG. 39D are diagrams of the longitudinal spherical aberration and various aberrations of the optical lens assembly of the ninth embodiment. Referring first to FIG. 38, the ninth embodiment of the optical lens assembly 10 of the invention is similar to the first embodiment, and the difference therebetween is as follows. The optical data, the aspheric coefficients, and the parameters of the lens elements 3, 4, 5, and 6 are somewhat different. Moreover, in this embodiment, the first lens element 3 and the second lens element 4 are made of glass having an Abbe number greater than 60, and the third lens element 5 and the fourth lens element 6 are made of plastic material. Besides, the object-side surface 51 of the third lens element 3 is a convex surface and has a convex portion 511 in a vicinity of the optical axis I and a convex portion 513 in a vicinity of a periphery of the third lens element 3. In addition, in this embodiment, the image-side surface 62 of the fourth lens element 6 has a concave portion 622 in a vicinity of the optical axis I and a convex portion 623 in a vicinity of a periphery of the fourth lens element 6. It should be mentioned here that, to clearly show the figure, in FIG. 38, a portion of reference numerals of the same concave portion and convex portion as the first embodiment is omitted. In addition, in this embodiment, the object-side surface 31 and the image-side surface 32 of the first lens element 3 are spherical surfaces, the object-side surface 41 and the image-side surface 42 of the second lens element 4 are spherical surfaces, and the object-side surfaces 51 and 61 and the image-side surfaces 52 and 62 are aspheric surfaces.

The detailed optical data of the optical lens assembly 10 is as shown in FIG. 40, and in the ninth embodiment, the effective focal length of the whole optical lens assembly 10 is 1.496 mm, the HFOV thereof is 72.000°, the Fno thereof is 2.746, the system length thereof is 10.128 mm, and the image height thereof is 1.745 mm.

FIG. 41 shows each of the aspheric coefficients of the object-side surfaces 51 and 61 and the image-side surfaces 52 and 62 of the ninth embodiment in general formula (1).

Moreover, the relationship between each of the important parameters in the optical lens assembly 10 of the ninth embodiment is as shown in FIG. 43.

In the longitudinal spherical aberration figure of FIG. 39A of the ninth embodiment in the condition that the pupil radius thereof is 0.2720 mm, the imaging point deviation of off-axis rays at different heights is controlled to be within the range of ±13.5 microns. In the two field curvature figures of FIG. 39B and FIG. 39C, the focal length variation amount of three representative wavelengths in the entire field of view is within ±20 microns. The distortion aberration figure of FIG. 39D shows that the distortion aberration of the ninth embodiment is maintained within the range of ±65%. Accordingly, in comparison to the current optical lens, in the ninth embodiment, good imaging quality can still be provided under the condition of the system length reduced to about 10.128 mm.

It can be known from the above that, the advantages of the ninth embodiment in comparison to the first embodiment are: the system length of the optical lens assembly 10 of the ninth embodiment is less than that of the first embodiment, the HFOV of the ninth embodiment is larger than that of the first embodiment, and the thermal stability of the ninth embodiment is better than that of the first embodiment.

FIG. 42 and FIG. 43 shows tables of each optical parameter of the nine embodiments. When the relationship formula between each optical parameter in the optical lens assembly 10 of the embodiments of the invention satisfies at least one of the following condition formulas, the designer can design an optical lens assembly having good optical performance and reduced overall length and being technically applicable:

1. When the optical lens assembly 10 satisfies at least one of $ALT/G12 \leq 6.8$, $ALT/T2 \leq 4.5$, $ALT/T3 \leq 4.3$, $ALT/G34 \leq 6.4$, and $ALT/AAG \leq 1.5$, lens parameters is easy to be adjusted to correct aberration under the condition that the total thickness of the lens elements is not increased, which is easy to shorten the length of the optical lens assembly 10. Preferably, the optical lens assembly 10 satisfies at least one of $0.1 \leq ALT/G12 \leq 6.8$, $0.1 \leq ALT/T2 \leq 4.5$, $0.1 \leq ALT/T3 \leq 4.3$, $0.1 \leq ALT/G34 \leq 6.4$, and $0.1 \leq ALT/AAG \leq 1.5$.

2. When the optical lens assembly 10 satisfies at least one of $EFL/G12 \leq 2.8$, $EFL/T2 \leq 1.6$, $EFL/T3 \leq 3.3$, $EFL/G34 \leq 4.5$, and $EFL/AAG \leq 1.1$, by limiting the relationship between the focal length and lens parameters, the EFL is not too large, which facilitates the design of large HFOV. Preferably, the optical lens assembly 10 satisfies at least one of $0.1 \leq EFL/G12 \leq 2.8$, $0.1 \leq EFL/T2 \leq 1.6$, $0.1 \leq EFL/T3 \leq 3.3$, $0.1 \leq EFL/G34 \leq 4.5$, and $0.1 \leq EFL/AAG \leq 1.1$.

3. When the optical lens assembly 10 satisfies at least one of $(T1+G23+T4)/T2 \leq 4.4$, $(T1+G23+T4)/G34 \leq 2$, $(T1+G23+T4)/AAG \leq 0.9$, $(T1+T4)/G12 \leq 4.7$, $(T1+T4)/T2 \leq 2.3$, $(T1+T4)/G34 \leq 1.4$, and $(T1+T4)/AAG \leq 1.1$, the thickness of each lens element is maintained to be a suitable value to prevent any parameter from being too large so that the thinning of the whole optical lens assembly 10 is hard, or too small so that the assembly is adversely affected or the production difficulty is increased. Preferably, the optical lens assembly 10 satisfies at least one of 0.1≤(T1+G23+T4)/T2≤4.4, 0.1≤(T1+G23+T4)/G34≤2, 0.1≤(T1+G23+T4)/AAG≤0.9, 0.1≤(T1+T4)/G12≤4.7, 0.1≤(T1+T4)/T2≤2.3, 0.1≤(T1+T4)/G34≤1.5, and 0.1≤(T1+T4)/AAG≤1.1.

However, based on the unpredictability of the optical system design, under the designs of the embodiments of the invention, by satisfying the above condition formulas, in the embodiments of the invention, lens length can be reduced, usable aperture is increased, field of view is increased, and imaging quality is increased, or assembly yield is increased such that the drawbacks of the prior art are reduced.

Based on the above, the optical lens assembly 10 of the embodiments of the invention may achieve the following efficacies and advantages:

1. The longitudinal spherical aberration, the field curvature, and the distortion of each embodiment of the invention all satisfy usage criteria. Moreover, the three representative wavelengths of 830 nm, 850 nm, and 870 nm are all concentrated in a vicinity of the imaging point at different heights of off-axis rays, and it can be seen from the deflection amplitude of each curve that the imaging point deviations at different heights of the off-axis rays can all achieve control and have good spherical aberration, aberration, and distortion control capability. Referring further to the imaging quality data, the distances between the three representative wavelengths of 830 nm, 850 nm, and 870 nm are also relatively close, indicating that the concentration of rays having different wavelengths under various states in the embodiments of the invention is good and excellent dispersion reduction capability is achieved, and therefore it can be known from the above that the embodiments of the invention have good optical performance. The optical lens assembly 10 of the embodiments of the invention can be used as night vision lens for IR imaging or pupil recognition lens, and it can be known from the above that the optical lens assembly 10 has good imaging effect to IR.

2. The convex portion 311 in the vicinity of the optical axis I of the object-side surface 31 of the first lens element 3 can facilitate the collection of imaging rays. When this is combined with the condition that the second lens element 4 has positive refracting power, the design of large HFOV is facilitated. The vicinity of the periphery of the object-side surface 41 of the second lens element 4 is the concave portion 414 and the vicinity of the periphery of the image-side surface 42 of the second lens element 4 is the convex portion 423, which facilitates correcting the aberration due to the first lens element 3. The vicinity of the optical axis I of the object-side surface 61 of the fourth lens element 6 is the concave portion 612, the vicinity of the periphery of the image-side surface 62 of the fourth lens element 6 is the convex portion 623, and at least one of the object-side surface 61 and the image-side surface 62 of the fourth lens element 6 is an aspheric surface, which facilitates slightly adjusting aberration due to the first to third lens elements 3, 4, and 5. The aforementioned lens surface shapes is combined with the aperture stop 2 disposed between the second lens element 4 and the third lens element 5, which facilitates the design of large HFOV.

3. When the second lens element 4 or the third lens element 5 is made of glass having an Abbe number greater than 60 in an optical lens assembly 10, the thermal stability of this optical lens assembly 10 is better than that of an optical lens assembly with all lens elements made of plastic material. Moreover, the cost of the optical lens assembly 10 with the third lens element 5 made of glass is less than the cost of the optical lens assembly 10 with both the first lens element 3 and the second lens element 4 that are made of glass.

4. In addition, the aforementioned limitation relations are provided in an exemplary sense and can be randomly and selectively combined and applied to the embodiments of the invention in different manners; the invention should not be limited to the above examples. In implementation of the invention, apart from the above-described relations, it is also possible to add additional detailed structure such as more concave and convex curvatures arrangement of a specific lens element or a plurality of lens elements so as to enhance control of system property and/or resolution. For example, it is optional to form an additional concave portion in the vicinity of the optical axis or an additional concave portion in the vicinity of the periphery on the image-side surface of the second lens element. It should be noted that the above-described details can be optionally combined and applied to the other embodiments of the invention under the condition where they are not in conflict with one another.

It will be apparent to those skilled in the art that various modifications and variations can be made to the structure of the invention without departing from the scope or spirit of the invention. In view of the foregoing, it is intended that the invention covers modifications and variations of this invention provided they fall within the scope of the following claims and their equivalents.

What is claimed is:

1. An optical lens assembly comprising a first lens element, a second lens element, a third lens element, and a fourth lens element from an object side to an image side in order along an optical axis, wherein the first lens element to the fourth lens element each comprise an object-side surface facing the object side and allowing imaging rays to pass through and an image-side surface facing the image side and allowing the imaging rays to pass through;
the first lens element has negative refracting power, and the object-side surface of the first lens element has a convex portion in a vicinity of the optical axis;
the second lens element has positive refracting power, and the object-side surface of the second lens element has a concave portion in a vicinity of a periphery of the second lens element;
the third lens element is made of glass having an Abbe number greater than 60; and
at least one of the object-side surface and the image-side surface of the fourth lens element is an aspheric surface,
wherein a quantity of lens elements having refracting power of the optical lens assembly is only four,
wherein the optical lens assembly satisfies: ALT/G34≤6.4, where ALT is a sum of thicknesses of the first lens element, the second lens element, the third lens element, and the fourth lens element on the optical axis, and G34 is an air gap from the third lens element to the fourth lens element on the optical axis.

2. The optical lens assembly of claim 1, wherein the optical lens assembly satisfies: ALT/G12≤6.8, where G12 is an air gap from the first lens element to the second lens element on the optical axis.

3. The optical lens assembly of claim 1, wherein the optical lens assembly satisfies: ALT/T2≤4.5, where T2 is a thickness of the second lens element on the optical axis.

4. The optical lens assembly of claim 1, wherein the optical lens assembly satisfies: ALT/T3≤4.3, where T3 is a thickness of the third lens element on the optical axis.

5. The optical lens assembly of claim 1, wherein the optical lens assembly satisfies: ALT/AAG≤1.5, where AAG is a sum of three air gaps from the first lens element to the fourth lens element on the optical axis.

6. An optical lens assembly comprising a first lens element, a second lens element, a third lens element, and a fourth lens element from an object side to an image side in order along an optical axis, wherein the first lens element to the fourth lens element each comprise an object-side surface facing the object side and allowing imaging rays to pass through and an image-side surface facing the image side and allowing the imaging rays to pass through;

the first lens element has negative refracting power, and the object-side surface of the first lens element has a convex portion in a vicinity of the optical axis;

the object-side surface of the second lens element has a concave portion in a vicinity of a periphery of the second lens element, and the image-side surface of the second lens element has a convex portion in a vicinity of the periphery of the second lens element;

the third lens element has refracting power; and the object-side surface of the fourth lens element has a concave portion in a vicinity of the optical axis, and the image-side surface of the fourth lens element has a convex portion in a vicinity of a periphery of the fourth lens element, wherein one of the second lens element and the third lens element is made of glass having an Abbe number greater than 60, and a quantity of lens elements having refracting power of the optical lens assembly is only four, wherein the optical lens assembly satisfies: EFL/G34≤4.5, where EFL is an effective focal length of the optical lens assembly, and G34 is an air gap from the third lens element to the fourth lens element on the optical axis.

7. The optical lens assembly of claim 6, wherein the optical lens assembly satisfies: EFL/G12≤2.8, where G12 is an air gap from the first lens element to the second lens element on the optical axis.

8. The optical lens assembly of claim 6, wherein the optical lens assembly satisfies: EFL/T2≤1.6, where T2 is a thickness of the second lens element on the optical axis.

9. The optical lens assembly of claim 6, wherein the optical lens assembly satisfies: EFL/T3≤3.3, where T3 is a thickness of the third lens element on the optical axis.

10. The optical lens assembly of claim 6, wherein the optical lens assembly satisfies: EFL/AAG≤1.1, where AAG is a sum of three air gaps from the first lens element to the fourth lens element on the optical axis.

11. An optical lens assembly comprising a first lens element, a second lens element, a third lens element, and a fourth lens element from an object side to an image side in order along an optical axis, wherein the first lens element to the fourth lens element each comprise an object-side surface facing the object side and allowing imaging rays to pass through and an image-side surface facing the image side and allowing the imaging rays to pass through;

the object-side surface of the first lens element has a convex portion in a vicinity of the optical axis;

the object-side surface of the second lens element has a concave portion in a vicinity of a periphery of the second lens element;

the third lens element is made of glass having an Abbe number greater than 60; and at least one of the object-side surface and the image-side surface of the fourth lens element is an aspheric surface, wherein a half field of view of the optical lens assembly is greater than 40 degrees, and a quantity of lens elements having refracting power of the optical lens assembly is only four, wherein the optical lens assembly satisfies: (T1+G23+T4)/G34≤2, where T1 is a thickness of the first lens element on the optical axis, G23 is an air gap from the second lens element to the third lens element on the optical axis, T4 is a thickness of the fourth lens element on the optical axis, and G34 is an air gap from the third lens element to the fourth lens element on the optical axis.

12. The optical lens assembly of claim 11, wherein the optical lens assembly satisfies: (T1+G23+T4)/T2≤4.4, where T2 is a thickness of the second lens element on the optical axis.

13. The optical lens assembly of claim 11, wherein the optical lens assembly satisfies: (T1+G23+T4)/AAG≤0.9, where AAG is a sum of three air gaps from the first lens element to the fourth lens element on the optical axis.

14. The optical lens assembly of claim 11, wherein the optical lens assembly satisfies: (T1+T4)/G12≤4.7, where G12 is an air gap from the first lens element to the second lens element on the optical axis.

15. The optical lens assembly of claim 11, wherein the optical lens assembly satisfies: (T1+T4)/T2≤2.3, where T2 is a thickness of the second lens element on the optical axis.

16. The optical lens assembly of claim 11, wherein the optical lens assembly satisfies: (T1+T4)/G34≤1.5.

17. The optical lens assembly of claim 11, wherein the optical lens assembly satisfies: (T1+T4)/AAG≤1.1, where AAG is a sum of three air gaps from the first lens element to the fourth lens element on the optical axis.

* * * * *